US012272206B2

(12) United States Patent
Acres

(10) Patent No.: US 12,272,206 B2
(45) Date of Patent: Apr. 8, 2025

(54) EVENT-BASED GAMING OPERATION FOR GAMING DEVICE

(71) Applicant: ACRES TECHNOLOGY, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

(21) Appl. No.: 17/868,364

(22) Filed: Jul. 19, 2022

(65) Prior Publication Data

US 2023/0041895 A1 Feb. 9, 2023

Related U.S. Application Data

(63) Continuation of application No. 16/996,357, filed on Aug. 18, 2020, now Pat. No. 11,430,290, which is a continuation of application No. 15/636,989, filed on Jun. 29, 2017, now Pat. No. 10,783,742, which is a (Continued)

(51) Int. Cl.
*G07F 17/32* (2006.01)
*G07F 17/34* (2006.01)

(52) U.S. Cl.
CPC ...... *G07F 17/3223* (2013.01); *G07F 17/3225* (2013.01); *G07F 17/3258* (2013.01); *G07F 17/34* (2013.01); *G07F 17/32* (2013.01); *G07F 17/326* (2013.01); *G07F 17/3267* (2013.01)

(58) Field of Classification Search
CPC ..... G07F 17/32; G07F 17/326; G07F 17/3267
See application file for complete search history.

(56) References Cited

U.S. PATENT DOCUMENTS

| | | | |
|---|---|---|---|
| 2,669,389 | A | 2/1954 | Mesi et al. |
| 3,124,355 | A | 3/1964 | Mentzer |
| 3,124,674 | A | 3/1964 | Edwards |

(Continued)

FOREIGN PATENT DOCUMENTS

| | | | |
|---|---|---|---|
| CA | 2754756 | | 1/2007 |
| CN | 1842826 | A | 10/2006 |

(Continued)

OTHER PUBLICATIONS

"White Paper: An Analysis of Harrah's Total Rewards Program" written and published by Gaming Market Advisor on or before Dec. 31, 2006, retrieved URL <http://www.gamingmarketadvisors.com/publications/Harrahs%20Total%20Reward%20White%20Paper.pdf>, 41 pages.

(Continued)

*Primary Examiner* — Chase E Leichliter
(74) *Attorney, Agent, or Firm* — Ballard Spahr LLP

(57) ABSTRACT

Embodiments of the present invention are directed to gaming devices and gaming systems that are configured to implement event-based gaming operations. Here, a gaming device includes a game event list that has game outcomes associated with each entry in the game event list. The game event list is generated before game play on the gaming device by selecting general game outcome types or specific game outcomes for each of the entries in the game event list. During game play, a game counter is incremented to a next entry in the game event list and an associated game outcome is displayed on the gaming device during the gaming event.

23 Claims, 13 Drawing Sheets

Related U.S. Application Data continuation of application No. 12/981,048, filed on Dec. 29, 2010, now Pat. No. 9,721,423.

(56) References Cited

U.S. PATENT DOCUMENTS

| | | | | |
|---|---|---|---|---|
| 3,684,290 | A | 8/1972 | Wayne | |
| 3,727,213 | A | 4/1973 | Kurtenbach | |
| 3,751,040 | A | 8/1973 | Carey | |
| 4,240,635 | A | 12/1980 | Brown | |
| 4,254,404 | A | 3/1981 | White | |
| 4,433,844 | A | 2/1984 | Hooker et al. | |
| 4,624,459 | A | 11/1986 | Kaufman | |
| 4,657,256 | A | 4/1987 | Okada | |
| 4,669,731 | A | 6/1987 | Clarke | |
| 4,836,546 | A | 6/1989 | DiRe et al. | |
| 4,887,813 | A | 12/1989 | Chiles, III et al. | |
| 5,022,653 | A | 6/1991 | Suttle et al. | |
| 5,024,439 | A | 6/1991 | Okada | |
| 5,027,102 | A | 6/1991 | Sweeny | |
| 5,031,914 | A | 7/1991 | Rosenthal | |
| 5,078,405 | A | 1/1992 | Jones et al. | |
| 5,083,785 | A | 1/1992 | Okada | |
| 5,152,529 | A | 10/1992 | Okada | |
| 5,178,395 | A | 1/1993 | Lovell | |
| 5,221,083 | A | 6/1993 | Dote | |
| 5,265,880 | A | 11/1993 | Maksymec | |
| 5,342,049 | A | 8/1994 | Wichinsky et al. | |
| 5,364,104 | A | 11/1994 | Jones et al. | |
| 5,377,973 | A | 1/1995 | Jones et al. | |
| 5,380,008 | A | 1/1995 | Mathis et al. | |
| 5,490,670 | A | 2/1996 | Hobert | |
| 5,536,016 | A | 7/1996 | Thompson | |
| 5,564,700 | A | 10/1996 | Celona | |
| 5,584,485 | A | 12/1996 | Jones et al. | |
| 5,586,766 | A | 12/1996 | Forte et al. | |
| 5,655,961 | A | 8/1997 | Acres et al. | |
| 5,674,128 | A | 10/1997 | Holch et al. | |
| 5,695,402 | A | 12/1997 | Stupak | |
| 5,697,844 | A | 12/1997 | Kohorn | |
| 5,743,798 | A | 4/1998 | Adams et al. | |
| 5,758,875 | A | 6/1998 | Giacalone, Jr. | |
| 5,766,076 | A | 6/1998 | Pease et al. | |
| 5,816,918 | A | 10/1998 | Kelly et al. | |
| 5,830,064 | A | 11/1998 | Bradish et al. | |
| 5,836,816 | A | 11/1998 | Bruin et al. | |
| 5,836,817 | A | 11/1998 | Acres et al. | |
| 5,851,147 | A | 12/1998 | Stupak et al. | |
| 5,910,048 | A | 6/1999 | Feinberg | |
| 5,913,726 | A | 6/1999 | Jones et al. | |
| 5,934,998 | A | 8/1999 | Forte et al. | |
| 5,941,770 | A | 8/1999 | Miers et al. | |
| 5,960,406 | A | 9/1999 | Rasansky et al. | |
| 5,984,779 | A | 11/1999 | Bridgeman et al. | |
| 6,003,013 | A | 12/1999 | Boushy et al. | |
| 6,012,983 | A | 1/2000 | Walker et al. | |
| 6,024,642 | A | 2/2000 | Stupak | |
| 6,030,109 | A | 2/2000 | Lobsenz | |
| 6,032,955 | A | 3/2000 | Luciano et al. | |
| 6,045,130 | A | 4/2000 | Jones et al. | |
| 6,048,272 | A | 4/2000 | Tsujita | |
| 6,059,659 | A | 5/2000 | Busch et al. | |
| 6,077,163 | A | 6/2000 | Walker et al. | |
| 6,086,477 | A | 7/2000 | Walker et al. | |
| 6,106,395 | A | 8/2000 | Begis | |
| 6,110,041 | A | 8/2000 | Walker et al. | |
| 6,110,043 | A | 8/2000 | Olsen | |
| 6,135,884 | A | 10/2000 | Hedrick et al. | |
| 6,146,273 | A | 11/2000 | Olsen | |
| 6,165,071 | A | 12/2000 | Weiss | |
| 6,168,521 | B1 | 1/2001 | Luciano et al. | |
| 6,183,362 | B1 | 2/2001 | Boushy | |
| 6,186,893 | B1 | 2/2001 | Walker et al. | |
| 6,196,918 | B1 | 3/2001 | Miers et al. | |
| 6,210,276 | B1 | 4/2001 | Mullins | |
| 6,217,448 | B1 | 4/2001 | Olsen | |
| 6,224,482 | B1 | 5/2001 | Bennet | |
| 6,234,900 | B1 | 5/2001 | Cumbers | |
| 6,254,483 | B1 | 7/2001 | Acres | |
| 6,264,560 | B1 | 7/2001 | Goldberg et al. | |
| 6,270,409 | B1 | 8/2001 | Shuster | |
| 6,289,382 | B1 | 9/2001 | Bowman-Amuah | |
| 6,293,866 | B1 | 9/2001 | Walker et al. | |
| 6,293,868 | B1 | 9/2001 | Bernard | |
| 6,302,793 | B1 | 10/2001 | Fertitta, III et al. | |
| 6,315,662 | B1 | 11/2001 | Jorasch et al. | |
| 6,315,666 | B1 | 11/2001 | Mastera et al. | |
| 6,319,122 | B1 | 11/2001 | Packes et al. | |
| 6,319,125 | B1 | 11/2001 | Acres | |
| 6,186,892 | B1 | 12/2001 | Frank et al. | |
| 6,336,859 | B2 | 1/2002 | Jones et al. | |
| 6,347,996 | B1 | 2/2002 | Gilmore et al. | |
| 6,364,314 | B1 | 4/2002 | Canterbury | |
| 6,364,768 | B1 | 4/2002 | Acres et al. | |
| 6,368,216 | B1 | 4/2002 | Hedrick et al. | |
| 6,371,852 | B1 | 4/2002 | Acres | |
| 6,375,567 | B1 | 4/2002 | Acres | |
| 6,390,917 | B1 | 5/2002 | Walker et al. | |
| 6,425,823 | B1 | 7/2002 | Byrne | |
| 6,428,002 | B1 | 8/2002 | Baranauskas | |
| 6,443,456 | B1 | 9/2002 | Gajor | |
| 6,454,648 | B1 | 9/2002 | Kelly et al. | |
| 6,457,045 | B1 | 9/2002 | Hanson et al. | |
| 6,471,588 | B2 | 10/2002 | Sakamoto | |
| 6,485,367 | B1 | 11/2002 | Joshi | |
| 6,485,368 | B2 | 11/2002 | Jones et al. | |
| 6,508,710 | B1 | 1/2003 | Paravia et al. | |
| 6,520,856 | B1 | 2/2003 | Walker et al. | |
| 6,533,664 | B1 * | 3/2003 | Crumby .................. | G07F 17/32<br>463/22 |
| 6,537,150 | B1 | 3/2003 | Luciano et al. | |
| 6,565,434 | B1 | 5/2003 | Acres | |
| 6,565,436 | B1 | 5/2003 | Baerlocher | |
| 6,569,013 | B1 | 5/2003 | Taylor | |
| 6,575,832 | B1 | 6/2003 | Manfredi et al. | |
| 6,592,457 | B1 | 7/2003 | Frohm et al. | |
| 6,599,186 | B1 | 7/2003 | Walker et al. | |
| 6,599,193 | B2 | 7/2003 | Baerlocher et al. | |
| 6,606,615 | B1 | 8/2003 | Jennings et al. | |
| 6,620,046 | B2 | 8/2003 | Rowe | |
| 6,634,922 | B1 | 10/2003 | Driscoll et al. | |
| 6,645,068 | B1 | 11/2003 | Kelly et al. | |
| 6,648,757 | B1 | 11/2003 | Slomiany et al. | |
| 6,652,378 | B2 | 11/2003 | Cannon et al. | |
| 6,656,047 | B1 | 12/2003 | Tarantino et al. | |
| 6,695,700 | B2 | 2/2004 | Walker et al. | |
| 6,697,165 | B2 | 2/2004 | Nakai et al. | |
| 6,702,670 | B2 | 3/2004 | Jasper et al. | |
| 6,709,331 | B2 | 3/2004 | Berman | |
| 6,712,693 | B1 | 3/2004 | Hettinger | |
| 6,712,695 | B2 | 3/2004 | Mothwurf et al. | |
| 6,722,985 | B2 | 4/2004 | Criss-Puszkiewicz et al. | |
| 6,749,510 | B2 | 6/2004 | Giobbi | |
| 6,751,657 | B1 | 6/2004 | Zothner | |
| 6,755,420 | B2 | 6/2004 | Colton | |
| 6,758,754 | B1 | 7/2004 | Lavanchy et al. | |
| 6,760,595 | B2 | 7/2004 | Inselberg | |
| 6,767,283 | B1 | 7/2004 | Weiss | |
| 6,780,104 | B2 | 8/2004 | Fox | |
| 6,786,824 | B2 | 9/2004 | Cannon | |
| 6,800,026 | B2 | 10/2004 | Cannon | |
| 6,800,027 | B2 | 10/2004 | Giobbi et al. | |
| 6,802,778 | B1 | 10/2004 | Lemay et al. | |
| 6,811,482 | B2 | 11/2004 | Letovsky | |
| 6,811,486 | B1 | 11/2004 | Luciano, Jr. | |
| 6,860,808 | B2 | 3/2005 | Levitan | |
| 6,860,810 | B2 | 3/2005 | Cannon et al. | |
| 6,939,227 | B2 | 9/2005 | Jorasch et al. | |
| 6,942,571 | B1 * | 9/2005 | McAllister .......... | G07F 17/3209<br>463/20 |
| 6,944,509 | B2 | 9/2005 | Altmaier et al. | |
| 6,948,171 | B2 | 9/2005 | Dan et al. | |
| 6,965,868 | B1 | 11/2005 | Bednarek | |
| 6,973,665 | B2 | 12/2005 | Dudkiewicz et al. | |
| RE38,982 | E | 2/2006 | Forte et al. | |

(56) References Cited

U.S. PATENT DOCUMENTS 6,997,380 B2 2/2006 Safaei et al.
6,998,806 B2 2/2006 Suzuki
7,037,195 B2 5/2006 Schneider et al.
7,048,628 B2 5/2006 Schneider
7,056,210 B2 6/2006 Bansemer et al.
7,069,232 B1 6/2006 Fox et al.
7,090,579 B2 8/2006 Tarantino
7,094,149 B2 8/2006 Walker et al.
7,094,150 B2 8/2006 Ungaro et al.
7,103,560 B1 9/2006 Fox et al.
7,131,908 B2 11/2006 Baerlocher
7,144,322 B2 12/2006 Gomez et al.
7,160,189 B2 1/2007 Walker et al.
7,169,052 B2 1/2007 Beaulieu et al.
7,175,521 B2 2/2007 McClintic
7,182,690 B2 2/2007 Giobbo et al.
7,184,965 B2 2/2007 Fox et al.
7,186,181 B2 3/2007 Rowe
7,192,346 B2 3/2007 Mathis
7,195,243 B2 3/2007 Kenny et al.
7,201,654 B1 4/2007 Jarvis et al.
7,210,998 B2 5/2007 Kazaoka et al.
7,251,805 B2 7/2007 Koo
7,300,351 B2 11/2007 Thomas
7,329,185 B2 2/2008 Conover et al.
7,338,372 B2 3/2008 Morrow et al.
7,361,089 B2 4/2008 Daly et al.
7,374,486 B2 5/2008 Baerlocher
7,384,338 B2 6/2008 Rothschild et al.
7,406,516 B2 7/2008 Davis et al.
7,410,422 B2 8/2008 Fine
7,416,186 B2 8/2008 Walker et al.
7,458,892 B2 12/2008 Walker et al.
7,500,916 B2 3/2009 Lieberman et al.
7,594,851 B2 9/2009 Falconer
7,601,060 B2 10/2009 Baerlocher et al.
7,628,691 B2 12/2009 Luciano et al.
7,674,180 B2 3/2010 Graham et al.
7,704,137 B2 4/2010 Englman
7,717,788 B2 5/2010 Rowe
7,744,453 B2 6/2010 Pacey
7,762,886 B2 7/2010 Pfennighausen et al.
7,765,121 B2 7/2010 Pace et al.
7,775,875 B2 * 8/2010 Nguyen .............. G07F 17/3241
463/19
7,775,876 B2 8/2010 Rowe
7,780,520 B2 8/2010 Baerlocher
7,811,167 B2 10/2010 Giobbi et al.
7,828,648 B2 11/2010 Jackson
7,846,018 B2 12/2010 Baerlocher
7,857,693 B1 * 12/2010 Johnson .................. G07F 17/32
463/43
7,874,911 B2 1/2011 Walker et al.
7,942,735 B2 5/2011 Meyer et al.
7,963,844 B2 6/2011 Walker et al.
8,052,517 B2 11/2011 Manfredi et al.
8,062,124 B2 11/2011 Jaffe
RE43,037 E 12/2011 Walker et al.
8,133,105 B2 3/2012 Walker et al.
8,277,302 B2 10/2012 Walker et al.
8,313,369 B2 11/2012 Acres
8,475,254 B2 7/2013 Acres
8,545,319 B2 10/2013 Kaneko
8,602,866 B2 12/2013 Acres
8,777,749 B1 7/2014 Mayeroff
8,956,214 B2 2/2015 Acres
8,992,306 B2 3/2015 Iddings et al.
9,501,907 B2 11/2016 Acres
9,619,973 B2 4/2017 Acres
9,659,442 B2 5/2017 Acres
9,704,331 B2 7/2017 Acres
9,721,423 B2 * 8/2017 Acres .................. G07F 17/3225
9,728,043 B2 8/2017 Acres
9,865,133 B2 1/2018 Acres
9,997,007 B2 6/2018 Acres
10,032,341 B2 7/2018 Acres
10,783,742 B2 * 9/2020 Acres .................. G07F 17/3258
10,964,164 B2 3/2021 Acres
11,017,626 B2 5/2021 Acres
11,430,290 B2 * 8/2022 Acres ...................... G07F 17/34
11,450,177 B2 9/2022 Acres
2001/0004609 A1 6/2001 Walker et al.
2001/0009865 A1 7/2001 Demar et al.
2001/0024015 A1 9/2001 Hogan et al.
2001/0046893 A1 11/2001 Giobbi et al.
2001/0048193 A1 12/2001 Yoseloff et al.
2002/0013173 A1 1/2002 Walker et al.
2002/0016202 A1 2/2002 Fertitta et al.
2002/0019253 A1 2/2002 Reitzen et al.
2002/0032052 A1 3/2002 Levitan
2002/0034981 A1 3/2002 Hisada
2002/0039923 A1 4/2002 Cannon et al.
2002/0055381 A1 5/2002 Tarantino
2002/0058545 A1 5/2002 Luciano
2002/0086726 A1 7/2002 Ainsworth
2002/0094855 A1 7/2002 Berman
2002/0103018 A1 8/2002 Rommerdahl et al.
2002/0107072 A1 8/2002 Giobbi
2002/0143652 A1 8/2002 Beckett
2002/0123376 A1 9/2002 Walker et al.
2002/0132664 A1 9/2002 Miller et al.
2002/0142825 A1 10/2002 Lark et al.
2002/0147040 A1 10/2002 Walker et al.
2002/0147043 A1 10/2002 Shulman et al.
2002/0147049 A1 10/2002 Russell
2002/0152120 A1 10/2002 Howington
2002/0167126 A1 11/2002 De Raedt et al.
2002/0177480 A1 11/2002 Rowe
2002/0177483 A1 11/2002 Cannon
2002/0187834 A1 12/2002 Rowe et al.
2002/0193162 A1 12/2002 Walker et al.
2002/0195773 A1 12/2002 Dunn
2002/0196342 A1 12/2002 Walker et al.
2003/0003988 A1 1/2003 Walker et al.
2003/0003989 A1 1/2003 Johnson
2003/0013512 A1 1/2003 Rowe
2003/0013516 A1 1/2003 Walker et al.
2003/0017865 A1 1/2003 Beaulieu et al.
2003/0032474 A1 2/2003 Kaminkow
2003/0036425 A1 2/2003 Kaminkow et al.
2003/0054875 A1 3/2003 Marks et al.
2003/0054878 A1 3/2003 Benoy et al.
2003/0054881 A1 3/2003 Hedrick et al.
2003/0060276 A1 3/2003 Walker et al.
2003/0064769 A1 4/2003 Muir
2003/0064771 A1 4/2003 Morrow et al.
2003/0067116 A1 4/2003 Colton
2003/0078088 A1 4/2003 Schneider
2003/0078101 A1 4/2003 Schneider et al.
2003/0083943 A1 5/2003 Adams et al.
2003/0087685 A1 5/2003 Hogan et al.
2003/0092484 A1 5/2003 Schneider et al.
2003/0100360 A1 5/2003 Manfredi et al.
2003/0110139 A1 6/2003 Gaynor
2003/0114217 A1 6/2003 Walker et al.
2003/0119575 A1 6/2003 Centouri et al.
2003/0125103 A1 7/2003 Tessmer et al.
2003/0135304 A1 7/2003 Sroub et al.
2003/0144048 A1 7/2003 Silva
2003/0176212 A1 * 9/2003 Schlottmann ........... G07F 17/34
463/20
2003/0178774 A1 9/2003 Marcilio
2003/0186733 A1 10/2003 Wolf et al.
2003/0187736 A1 10/2003 Teague et al.
2003/0190944 A1 10/2003 Manfredi et al.
2003/0195029 A1 10/2003 Frohm et al.
2003/0199295 A1 10/2003 Vancura
2003/0199312 A1 10/2003 Walker et al.
2003/0204474 A1 10/2003 Capek et al.
2003/0207711 A1 11/2003 Rowe
2003/0209853 A1 11/2003 Harris
2003/0211884 A1 11/2003 Gauselmann
2003/0216169 A1 11/2003 Walker et al.
2003/0220138 A1 11/2003 Walker et al.

(56) References Cited

U.S. PATENT DOCUMENTS

2003/0220139 A1 11/2003 Peterson
2003/0220143 A1 11/2003 Shteyn et al.
2003/0228901 A1 12/2003 Walker et al.
2003/0232640 A1 12/2003 Walker et al.
2003/0234489 A1 12/2003 Okada
2003/0236110 A1 12/2003 Beaulieu et al.
2004/0002369 A1 1/2004 Walker et al.
2004/0002377 A1 1/2004 Staw et al.
2004/0009808 A1 1/2004 Gauselmann
2004/0029631 A1* 2/2004 Duhamel ............ G07F 17/3267 463/20
2004/0038732 A1 2/2004 Vancura
2004/0038735 A1 2/2004 Steil et al.
2004/0038736 A1 2/2004 Bryant et al.
2004/0048650 A1 3/2004 Mierau et al.
2004/0053657 A1 3/2004 Fiden et al.
2004/0053681 A1 3/2004 Jordan et al.
2004/0063484 A1 4/2004 Dreaper et al.
2004/0072609 A1 4/2004 Ungaro et al.
2004/0072618 A1 4/2004 Bartholomew et al.
2004/0103013 A1 5/2004 Jameson
2004/0121833 A1 6/2004 Mezen et al.
2004/0142742 A1 7/2004 Schneider et al.
2004/0158536 A1 8/2004 Kowal et al.
2004/0166918 A1 8/2004 Walker et al.
2004/0166940 A1 8/2004 Rothschild
2004/0180722 A1 9/2004 Giobbi
2004/0185932 A1* 9/2004 Lombardo .......... G07F 17/3262 463/21
2004/0198485 A1 10/2004 Loose et al.
2004/0203611 A1 10/2004 Laporta et al.
2004/0204213 A1 10/2004 Schugar et al.
2004/0204216 A1 10/2004 Schugar
2004/0204222 A1 10/2004 Roberts
2004/0214637 A1 10/2004 Nonaka
2004/0219967 A1 11/2004 Giobbi et al.
2004/0224750 A1 11/2004 Al-Ziyoud
2004/0229671 A1 11/2004 Stronach et al.
2004/0229683 A1 11/2004 Mothwurf et al.
2004/0229700 A1 11/2004 Cannon et al.
2004/0235542 A1 11/2004 Stronach et al.
2004/0242313 A1 12/2004 Munoz
2004/0248642 A1 12/2004 Rothschild
2004/0254010 A1 12/2004 Fine
2004/0266517 A1 12/2004 Bleich et al.
2005/0014558 A1 1/2005 Estey
2005/0026674 A1 2/2005 Wolf et al.
2005/0043072 A1 2/2005 Nelson
2005/0043086 A1 2/2005 Schneider
2005/0043088 A1 2/2005 Nguyen et al.
2005/0043092 A1 2/2005 Gauselmann
2005/0043094 A1 2/2005 Nguyen et al.
2005/0049028 A1 3/2005 Gornez et al.
2005/0054438 A1 3/2005 Rothschild et al.
2005/0056995 A1 3/2005 Tempest
2005/0059467 A1 3/2005 Saffari et al.
2005/0064926 A1 3/2005 Walker et al.
2005/0070356 A1 3/2005 Mothwurf et al.
2005/0075164 A1 4/2005 Krynicky
2005/0096121 A1 5/2005 Gilliland et al.
2005/0096124 A1 5/2005 Stronach
2005/0101375 A1 5/2005 Webb et al.
2005/0101379 A1 5/2005 Falconer
2005/0119052 A1 6/2005 Russell et al.
2005/0124411 A1 6/2005 Schneider et al.
2005/0124415 A1 6/2005 Centuori et al.
2005/0148377 A1 7/2005 Goldberg et al.
2005/0148380 A1 7/2005 Cannon et al.
2005/0148383 A1 7/2005 Mayeroff
2005/0153773 A1 7/2005 Nguyen et al.
2005/0164764 A1 7/2005 Ghaly
2005/0181856 A1 8/2005 Cannon et al.
2005/0181860 A1 8/2005 Nguyen et al.
2005/0181862 A1 8/2005 Asher et al.
2005/0187014 A1 8/2005 Saffari et al.
2005/0192080 A1 9/2005 Cote et al.
2005/0208995 A1 9/2005 Marshall et al.
2005/0215311 A1 9/2005 Hornik et al.
2005/0215314 A1 9/2005 Schneider et al.
2005/0215316 A1 9/2005 Rowe et al.
2005/0233794 A1 10/2005 Cannon et al.
2005/0239541 A1 10/2005 Jorasch et al.
2005/0239545 A1 10/2005 Rowe
2005/0251440 A1 11/2005 Bednarek
2005/0255902 A1 11/2005 Lind
2005/0266905 A1 12/2005 Emori et al.
2006/0009284 A1 1/2006 Schwartz et al.
2006/0025205 A1 2/2006 Casey et al.
2006/0025207 A1 2/2006 Walker et al.
2006/0025210 A1 2/2006 Johnson
2006/0030391 A1 2/2006 Casey et al.
2006/0030400 A1 2/2006 Mathis
2006/0040723 A1 2/2006 Baerlocher et al.
2006/0040730 A1 2/2006 Walker et al.
2006/0046816 A1 3/2006 Walker
2006/0046830 A1 3/2006 Webb
2006/0046835 A1 3/2006 Walker et al.
2006/0052160 A1 3/2006 Saffari et al.
2006/0058095 A1 3/2006 Berman et al.
2006/0058097 A1 3/2006 Berman et al.
2006/0063578 A1 3/2006 Bansemer et al.
2006/0068898 A1 3/2006 Maya
2006/0068899 A1 3/2006 White et al.
2006/0068903 A1 3/2006 Walker et al.
2006/0073872 A1 4/2006 B-Jensen et al.
2006/0073884 A1 4/2006 Walker et al.
2006/0073887 A1 4/2006 Nguyen et al.
2006/0079310 A1 4/2006 Friedman et al.
2006/0079314 A1 4/2006 Walker et al.
2006/0084496 A1 4/2006 Jaffe et al.
2006/0094493 A1 5/2006 Kido
2006/0100009 A1* 5/2006 Walker ................ G07F 17/3227 463/25
2006/0105836 A1 5/2006 Walker et al.
2006/0116201 A1 6/2006 Gauselmann
2006/0121972 A1 6/2006 Walker et al.
2006/0121981 A1 6/2006 Pfenninghausen et al.
2006/0128467 A1 6/2006 Thomas
2006/0135249 A1 6/2006 Seelig et al.
2006/0148559 A1 7/2006 Jordan et al.
2006/0149632 A1 7/2006 Register et al.
2006/0154714 A1 7/2006 Montross et al.
2006/0174270 A1 8/2006 Westberg et al.
2006/0183530 A1 8/2006 Ellis
2006/0183536 A1 8/2006 Gagner et al.
2006/0189378 A1 8/2006 Aoki
2006/0189363 A1 9/2006 Strom
2006/0199631 A1 9/2006 McGill et al.
2006/0205483 A1 9/2006 Meyer et al.
2006/0211479 A1 9/2006 Walker et al.
2006/0211486 A1 9/2006 Walker et al.
2006/0217175 A1 9/2006 Walker et al.
2006/0229127 A1 10/2006 Walker et al.
2006/0234791 A1* 10/2006 Nguyen .............. G07F 17/3241 463/16
2006/0247034 A1 11/2006 Schneider et al.
2006/0247041 A1 11/2006 Walker et al.
2006/0252510 A1 11/2006 Walker et al.
2006/0252512 A1 11/2006 Walker et al.
2006/0252516 A1* 11/2006 Walker ................ G07F 17/3237 463/25
2006/0258422 A1 11/2006 Walker et al.
2006/0258425 A1 11/2006 Edidin et al.
2006/0258432 A1 11/2006 Packer et al.
2006/0287034 A1 12/2006 Englman et al.
2006/0287045 A1 12/2006 Walker et al.
2006/0287098 A1 12/2006 Morrow et al.
2006/0287102 A1 12/2006 White et al.
2007/0001396 A1 1/2007 Walker et al.
2007/0010309 A1 1/2007 Giobbi et al.
2007/0010315 A1 1/2007 Hein
2007/0050256 A1 3/2007 Walker et al.
2007/0054733 A1 3/2007 Baerlocher
2007/0060252 A1 3/2007 Taylor

(56) References Cited

U.S. PATENT DOCUMENTS

2007/0060274 A1 3/2007 Rowe et al.
2007/0060323 A1 3/2007 Isaac et al.
2007/0060387 A1 3/2007 Enzminger et al.
2007/0082727 A1 4/2007 Ebisawa et al.
2007/0087806 A1 4/2007 Luciano et al.
2007/0087818 A1 4/2007 Walker et al.
2007/0105615 A1 5/2007 Lind
2007/0105618 A1 5/2007 Steil
2007/0106553 A1 5/2007 Jordan et al.
2007/0111776 A1 5/2007 Griswold et al.
2007/0112609 A1 5/2007 Howard et al.
2007/0117616 A1 5/2007 Bartholomew
2007/0117619 A1 5/2007 Walker et al.
2007/0117623 A1 5/2007 Nelson et al.
2007/0129147 A1 6/2007 Gagner
2007/0135214 A1 6/2007 Walker et al.
2007/0143156 A1 6/2007 van Deursen
2007/0167210 A1 7/2007 Kelly et al.
2007/0184897 A1 8/2007 Fujimoto
2007/0191087 A1 8/2007 Thomas et al.
2007/0191089 A1 8/2007 Yoshizawa
2007/0197247 A1 8/2007 Inselberg
2007/0205556 A1 9/2007 Roemer et al.
2007/0259709 A1* 11/2007 Kelly .................. G07F 17/3211 463/20
2007/0275777 A1 11/2007 Walker et al.
2007/0293302 A1 12/2007 Lind et al.
2008/0009340 A1 1/2008 Walker et al.
2008/0015004 A1 1/2008 Gatto et al.
2008/0015006 A1 1/2008 George
2008/0032759 A1 2/2008 Takahashi
2008/0039190 A1 2/2008 Walker et al.
2008/0045317 A1 2/2008 Seelig et al.
2008/0058105 A1 3/2008 Combs et al.
2008/0064495 A1 3/2008 Bryant et al.
2008/0070669 A1 3/2008 Walker et al.
2008/0076576 A1 3/2008 Graham et al.
2008/0090651 A1 4/2008 Baerlocher
2008/0096636 A1 4/2008 Power
2008/0102921 A1 5/2008 Urquhart
2008/0102935 A1 5/2008 Finnimore
2008/0102946 A1 5/2008 Amour
2008/0108423 A1* 5/2008 Benbrahim ............. G07F 17/34 463/16
2008/0108433 A1 5/2008 DiMichele et al.
2008/0113734 A1* 5/2008 Watkins .................. G07F 17/34 463/19
2008/0113744 A1 5/2008 Whitcher
2008/0113749 A1 5/2008 Williams et al.
2008/0113777 A1 5/2008 Anderson
2008/0113779 A1 5/2008 Cregan
2008/0113811 A1 5/2008 Linard et al.
2008/0119283 A1 5/2008 Baerlocher
2008/0132320 A1 6/2008 Rodgers
2008/0146331 A1 6/2008 Nordman et al.
2008/0153564 A1 6/2008 Baerlocher et al.
2008/0153596 A1 6/2008 Nguyen
2008/0161090 A1 7/2008 Okada
2008/0171586 A1 7/2008 Roemer
2008/0176647 A1 7/2008 Acres
2008/0182655 A1 7/2008 DeWaal et al.
2008/0207313 A1 8/2008 Acres
2008/0214300 A1 9/2008 Williams et al.
2008/0220840 A1 9/2008 Katz et al.
2008/0220861 A1 9/2008 Okada
2008/0227551 A1 9/2008 Kelly et al.
2008/0234035 A1 9/2008 Malek
2008/0242394 A1 10/2008 Sakuma
2008/0242398 A1 10/2008 Harris et al.
2008/0248851 A1 10/2008 Bloom
2008/0248865 A1* 10/2008 Tedesco .................. G07F 17/32 463/25
2008/0254883 A1* 10/2008 Patel ................... G07F 17/3276 463/31
2008/0254886 A1 10/2008 Kelly
2008/0254893 A1* 10/2008 Patel ................... G07F 17/3267 463/42
2008/0261699 A1 10/2008 Topham et al.
2008/0268959 A1 10/2008 Bryson et al.
2008/0272541 A1 11/2008 Walker et al.
2008/0280669 A1 11/2008 Kane et al.
2008/0280674 A1 11/2008 Sakuma
2008/0287186 A1 11/2008 Sakuma
2008/0293467 A1 11/2008 Mathis
2008/0311973 A1 12/2008 Jaffe
2008/0318656 A1 12/2008 Walker et al.
2009/0005170 A9 1/2009 Kelly et al.
2009/0036202 A1 2/2009 Baerlocher et al.
2009/0042652 A1 2/2009 Baerlocher et al.
2009/0069064 A1 3/2009 Ghaly
2009/0069068 A1 3/2009 Cole et al.
2009/0070081 A1 3/2009 Saenz et al.
2009/0075728 A1 3/2009 Acres
2009/0088239 A1 4/2009 Iddings et al.
2009/0088252 A1 4/2009 Nicely et al.
2009/0093289 A1 4/2009 Toyoda
2009/0117981 A1 5/2009 Yoshizawa
2009/0118005 A1 5/2009 Kelly et al.
2009/0124327 A1 5/2009 Caputo et al.
2009/0124332 A1 5/2009 Baerlocher
2009/0124346 A1 5/2009 Baerlocher
2009/0124364 A1 5/2009 Cuddy et al.
2009/0131145 A1* 5/2009 Aoki ................... G07F 17/3244 463/20
2009/0131150 A1* 5/2009 Iverson ............... G07F 17/3211 463/20
2009/0131175 A1 5/2009 Kelly et al.
2009/0137311 A1* 5/2009 Iverson ............... G07F 17/3213 463/20
2009/0170588 A1 7/2009 Baerlocher
2009/0170608 A1 7/2009 Herrmann et al.
2009/0176580 A1 7/2009 Herrmann et al.
2009/0221354 A1 9/2009 Shai-Hee
2009/0233682 A1 9/2009 Kato et al.
2009/0239601 A1 9/2009 Macke
2009/0239622 A1 9/2009 Fujimori et al.
2009/0239628 A1 9/2009 Fujimori et al.
2009/0239648 A1 9/2009 Acres
2009/0239660 A1 9/2009 Acres
2009/0239661 A1 9/2009 Acres
2009/0247284 A1 10/2009 Sugiyama et al.
2009/0253477 A1 10/2009 Teranishi
2009/0253478 A1 10/2009 Walker et al.
2009/0253490 A1 10/2009 Teranishi
2009/0258693 A1* 10/2009 Preston ................... G07F 17/32 463/20
2009/0270168 A1 10/2009 Englman et al.
2009/0286590 A1 11/2009 Bennet
2009/0291732 A1* 11/2009 Lutnick ............... G07F 17/3267 463/16
2009/0305770 A1* 12/2009 Bennett ................... G07F 17/32 463/20
2009/0325669 A1 12/2009 Kelly et al.
2009/0325670 A1 12/2009 Kelly et al.
2010/0016055 A1 1/2010 Englman
2010/0041464 A1 2/2010 Arezina et al.
2010/0048286 A1 2/2010 Okada et al.
2010/0056248 A1 3/2010 Acres
2010/0056259 A1 3/2010 Okada
2010/0075741 A1 3/2010 Aoki et al.
2010/0105454 A1 4/2010 Weber et al.
2010/0105466 A1 4/2010 Inamure et al.
2010/0113130 A1 5/2010 Kamano et al.
2010/0120492 A1* 5/2010 Davis .................. G07F 17/3227 463/20
2010/0120506 A1 5/2010 Davis et al.
2010/0120514 A1 5/2010 Caputo
2010/0124960 A1 5/2010 Lutnick et al.
2010/0124967 A1 5/2010 Lutnick et al.
2010/0124981 A1 5/2010 Kato et al.
2010/0124988 A1 5/2010 Amos et al.

(56) References Cited

U.S. PATENT DOCUMENTS

| | | | | |
|---|---|---|---|---|
| 2010/0210336 | A1* | 8/2010 | Berman | G07F 17/3267 463/16 |
| 2010/0210338 | A1 | 8/2010 | Taylor | |
| 2010/0210342 | A1 | 8/2010 | Pollack | |
| 2010/0240439 | A1* | 9/2010 | Englman | A63F 9/24 463/20 |
| 2010/0267440 | A1 | 10/2010 | Walker et al. | |
| 2010/0285867 | A1 | 11/2010 | Okada | |
| 2010/0291993 | A1* | 11/2010 | Gagner | G07F 17/3211 463/36 |
| 2010/0304834 | A1 | 12/2010 | Okada | |
| 2011/0009177 | A1 | 1/2011 | Katz et al. | |
| 2011/0034237 | A1 | 2/2011 | Schulhof et al. | |
| 2011/0039610 | A1 | 2/2011 | Baerlocher et al. | |
| 2011/0039615 | A1 | 2/2011 | Acres | |
| 2011/0077067 | A1 | 3/2011 | Ellis | |
| 2011/0081958 | A1 | 4/2011 | Herrmann et al. | |
| 2011/0081964 | A1* | 4/2011 | Acres | G07F 17/3244 463/20 |
| 2011/0117987 | A1* | 5/2011 | Aoki | G07F 17/32 463/20 |
| 2011/0130198 | A1 | 6/2011 | Van Linden | |
| 2011/0159950 | A1 | 6/2011 | Okada | |
| 2011/0165938 | A1 | 7/2011 | Anderson et al. | |
| 2011/0218030 | A1 | 9/2011 | Acres | |
| 2011/0269535 | A1* | 11/2011 | Kelly | G07F 17/3239 463/25 |
| 2011/0275438 | A9 | 11/2011 | Hardy et al. | |
| 2011/0281632 | A1 | 11/2011 | Okada | |
| 2011/0287826 | A1 | 11/2011 | Kato et al. | |
| 2011/0294563 | A1 | 12/2011 | Jaffe | |
| 2012/0077565 | A1 | 3/2012 | Barbalet | |
| 2012/0108337 | A1 | 5/2012 | Kelly et al. | |
| 2012/0115566 | A1 | 5/2012 | Fujisawa et al. | |
| 2012/0122558 | A1 | 5/2012 | Lyons et al. | |
| 2012/0135800 | A1 | 5/2012 | Acres | |
| 2012/0172107 | A1 | 7/2012 | Acres | |
| 2012/0172108 | A1 | 7/2012 | Acres | |
| 2012/0172130 | A1* | 7/2012 | Acres | G07F 17/3223 463/42 |
| 2012/0190425 | A1 | 7/2012 | Barbalet | |
| 2012/0270638 | A1 | 10/2012 | Eubanks | |
| 2017/0178845 | A1 | 6/2017 | Kim | |
| 2017/0228977 | A1 | 8/2017 | Acres | |
| 2017/0287288 | A1 | 10/2017 | Acres | |
| 2017/0301175 | A1 | 10/2017 | Acres | |
| 2017/0301180 | A1* | 10/2017 | Acres | G07F 17/3225 |
| 2018/0082537 | A1 | 3/2018 | Acres | |
| 2018/0253930 | A1 | 9/2018 | Acres | |
| 2018/0342133 | A1 | 11/2018 | Acres | |
| 2019/0304240 | A1 | 10/2019 | Acres | |
| 2020/0051400 | A1 | 2/2020 | Acres | |
| 2020/0118395 | A1 | 4/2020 | Acres | |
| 2020/0134972 | A1 | 4/2020 | Acres | |
| 2020/0380818 | A1* | 12/2020 | Acres | G07F 17/3225 |
| 2021/0201620 | A1 | 7/2021 | Acres | |
| 2021/0264717 | A1 | 8/2021 | Acres | |
| 2022/0392298 | A1 | 12/2022 | Acres | |
| 2023/0041895 | A1* | 2/2023 | Acres | G07F 17/3223 |

FOREIGN PATENT DOCUMENTS

| | | | |
|---|---|---|---|
| CN | 101043922 | A | 9/2007 |
| EP | 141264 | | 5/1985 |
| EP | 896304 | | 2/1999 |
| EP | 896308 | | 2/1999 |
| EP | 919965 | | 6/1999 |
| EP | 981397 | | 3/2000 |
| EP | 896304 | A3 | 8/2000 |
| EP | 919965 | A3 | 8/2000 |
| EP | 1091789 | | 4/2001 |
| EP | 981397 | A4 | 1/2002 |
| EP | 1231577 | | 8/2002 |
| EP | 896308 | B1 | 10/2003 |
| EP | 1351180 | | 10/2003 |
| EP | 1369830 | | 12/2003 |
| EP | 1490849 | | 12/2004 |
| EP | 1496419 | | 1/2005 |
| EP | 1623375 | | 2/2006 |
| EP | 1637196 | | 3/2006 |
| EP | 1832952 | | 9/2007 |
| JP | 2-21883 | | 1/1990 |
| WO | 95/21665 | | 8/1995 |
| WO | 95/31262 | | 11/1995 |
| WO | 96/35490 | | 11/1995 |
| WO | 97/46293 | | 12/1997 |
| WO | 00/17825 | | 3/2000 |
| WO | 00/32286 | | 6/2000 |
| WO | 00/17825 | A3 | 10/2000 |
| WO | 00/64545 | | 11/2000 |
| WO | 01/36059 | | 5/2001 |
| WO | 01/59680 | | 8/2001 |
| WO | 01/80961 | | 11/2001 |
| WO | 03/066179 | | 8/2003 |
| WO | 03/089092 | | 10/2003 |
| WO | 2004/046859 | | 6/2004 |
| WO | 2005008514 | | 1/2005 |
| WO | 2005/029279 | | 3/2005 |
| WO | 2005/029287 | | 3/2005 |
| WO | 2005/099845 | | 10/2005 |
| WO | 2005/113093 | | 12/2005 |
| WO | 2006/014745 | | 2/2006 |
| WO | 2006/014770 | | 2/2006 |
| WO | 2006/014990 | | 2/2006 |
| WO | 2006/032498 | | 3/2006 |
| WO | 2006023401 | A1 | 3/2006 |
| WO | 2006/036948 | | 4/2006 |
| WO | 2006/055518 | | 5/2006 |
| WO | 2006/060442 | | 6/2006 |
| WO | 2006/060493 | | 6/2006 |
| WO | 2007/087286 | | 8/2007 |
| WO | 2008/024705 | | 2/2008 |

OTHER PUBLICATIONS

Acres, John, An Ingenious Internet Marketing Tool, Slot Operations Management / Casino Enterprise Management, Aug. 2007, pp. 8-10.

Acres, John, Measuring the Player Experience: What a Squiggly Line Can Tell You, Inside Edge / Slot Manager, January / February, pp. 28-29.

Acres, John, The Future of Gaming, Where Will You be in 10 Years? Slot Operations Management, / Casino Enterprise Management, Jul. 2007, pp. 8-10, 12.

U.S. Appl. No. 17/957,849 (2023/0148405), filed Oct. 14, 2014 (Apr. 14, 2016), John F. Acres (Acres Technology).

U.S. Appl. No. 17/886,861 (2022/0392298), filed Aug. 12, 2022 (Dec. 8, 2022), John F. Acres (Acres Technology).

* cited by examiner

EVENT-BASED GAMING OPERATION FOR GAMING DEVICE

RELATED APPLICATIONS

This application is a continuation of U.S. patent application Ser. No. 16/996,357 filed Aug. 18, 2020, which is a continuation of U.S. patent application Ser. No. 15/636,989 filed Jun. 29, 2017, now U.S. Pat. No. 10,783,742, issued Sep. 22, 2020, which is a continuation of U.S. patent application Ser. No. 12/981,048 filed Dec. 29, 2010, now U.S. Pat. No. 9,721,423, issued Aug. 1, 2017, which are incorporated herein in their entirety.

FIELD OF THE INVENTION

This disclosure relates generally to gaming devices, and more particularly to event-based gaming operation for gaming devices.

BACKGROUND

Typically game results of gaming devices are determined by analyzing a series of random selections associated with the game. For example, in spinning reel slot machines, a reel-stop position for each reel is randomly selected. Once each random selection is made, the combination of randomly selected reel-stop positions is analyzed to determine if the combination of symbols associated with the reel-stop positions results in an award for the player. Similarly, in video poker or blackjack random cards are selected and then analyzed to see if the combination of randomly selected cards results in an award for the player.

The process of making a series of random selections and then analyzing the results of these selections imposes several limitations both in the capabilities of gaming devices and the design of the games on the gaming devices. For the game devices themselves, the above process relies on multiple random selections in order to arrive at a specific outcome, which often makes for a very skewed distribution timelines for some awards and bonuses. Additionally, this conventional process limits the flexibility of the machine in awarding specific outcomes resulting from other triggering events. In the slot machine example, a random number must be used for each reel to determine which reel stop or stops are to be displayed on a game outcome display. With this conventional technique, large awards, for example, may hit on average only once every 10,000 games and secondary bonus games may hit, for example, once every 75 games on average. Due to the random nature of the determination process, however, the large award may still not have hit 100,000 games after the last time it hit. The bonus, on the other hand, may hit two times in a row and then not hit again for 250 games. Players are aware of the volatile nature of gaming devices; however, a player that experiences a long losing streak or a long streak with no significant wins may get frustrated and leave. Even if a player is not aware that a bonus may hit, for example, every 75 games on average, the player may expect the bonus or another significant award to occur periodically to stem the continued reduction of credits on the games credit meter from placing repeated wagers on the gaming device.

For demonstration purposes, certain reel stop combinations can be programmed into the game logic to illustrate a particular bonus or jackpot win. However, during actual game play in which a player is wagering on the outcome of the gaming device, the game outcomes are often limited by the combination of randomly selected reel stops; thereby limiting the ability to dictate certain symbol combinations displayed on the reels in response to triggering events. This dictation of certain symbol combinations may be desirable to alter the payback percentage of the gaming devices, provide bonuses to the players, or guarantee that certain gaming events happen within a given time frame.

In addition, during the design of a gaming device having spinning reels, it is often difficult to obtain multiple exact payback percentages for a given gaming machine because of the limitations involved in assigning values to each reel stop and/or setting up reel strips. For mechanical spinning reel games, reel strips typically include twenty-two physical reel stops. Game designers may assign a certain number of virtual stops or paytable stops to each of these physical stops to allow large prizes to be given away less than once every 10,648 spins. This allocation of virtual stops can be challenging when attempting to meet multiple precise payback percentage paytables as well as difficult in setting hit frequencies of winning symbol combinations. For multi-line video slot games, more precise payback percentage paytables are easier to obtain, but it still is difficult to balance the desired hit frequencies of certain outcomes with dialing in the desired payback percentage for the entire game paytable.

DETAILED DESCRIPTION

Figure 1:
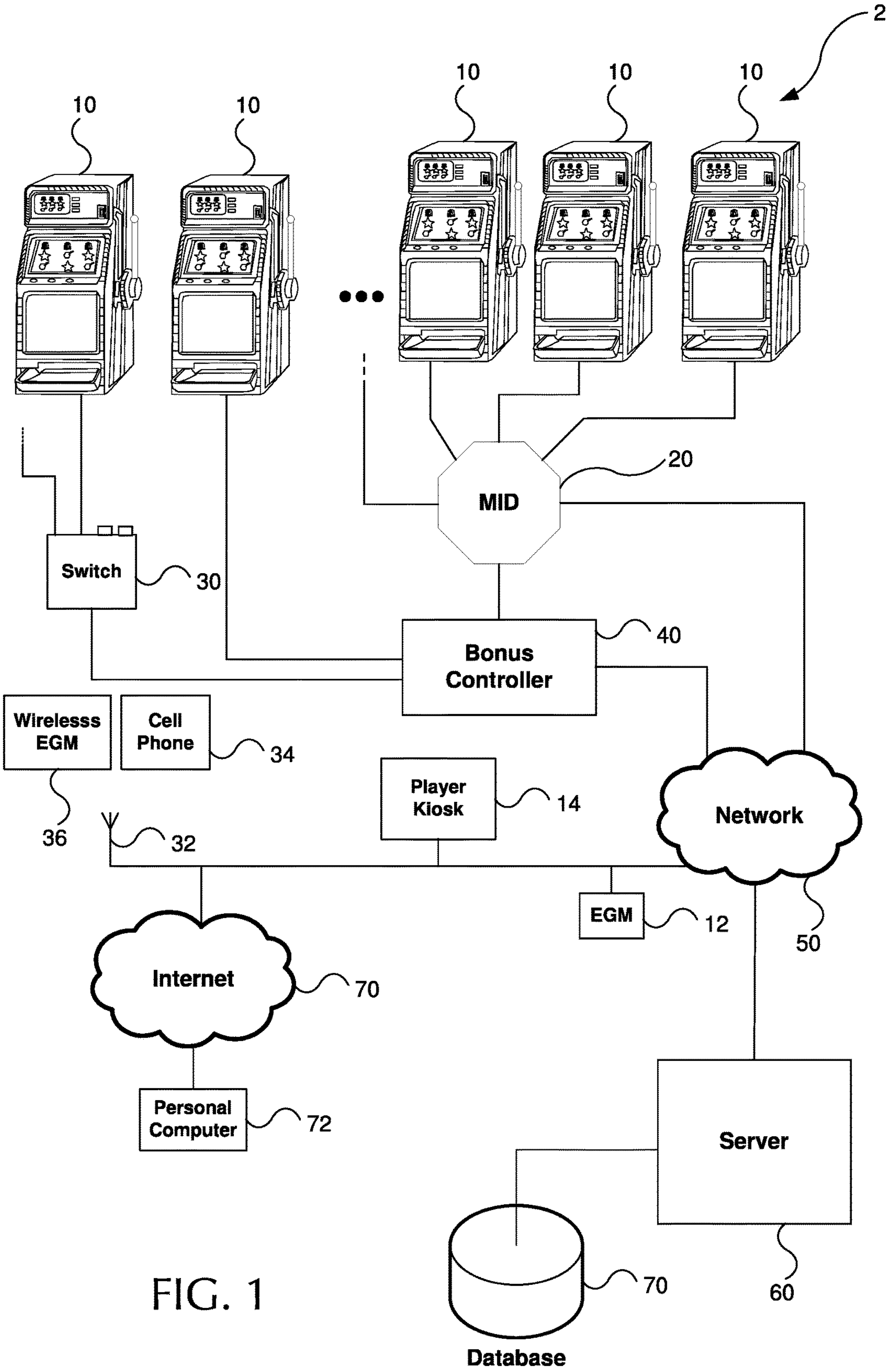
FIG. 1 is a system diagram illustrating various components of a gaming system according to embodiments of the invention.

FIG. 1 is a system diagram illustrating various components of a gaming system according to embodiments of the invention. Referring to FIG. 1, the gaming system 2 includes several gaming devices, also referred to as Electronic Gaming Machines (EGMs) 10 that are connected to a gaming network 50 through various communication mechanisms.

In general, a gaming network 50 connects any of a number of EGMs 10, or other gaming devices, such as those described below, for central management. Accounting and other functions may be served by a connected server 60 and database 70. For example many player tracking functions, bonusing systems, and promotional systems may be centrally administrated from the server 60 and database 70. In some embodiments there may be multiple servers 60 and databases 70, each performing different functions. In other embodiments functions may be combined and operate on a single or small group of servers 60, each with their own database 70 or combined databases.

Many of the EGMs 10 of FIG. 1 connect to the gaming network 50 through a Machine Interface Device, MID 20. In general, the MID 20 is a multi-protocol interface that monitors communication between the gaming network 50 and the EGM 10. In a common embodiment, the MID 20 communicates to the EGM 10 through a standard gaming network port, using a standard gaming network protocol, SAS, which is well known in the gaming industry. Most modern games include at least one communication port, which is commonly a SAS port or a port for another communication protocol. The MID 20, along with its various functions and communication methods is described in detail with reference to FIGS. 3A and 3B below.

Other EGMs 10 in FIG. 1 connect to the gaming network 50 through a bonus controller 40, which may be coupled between the gaming network 50 and gaming device 10. The bonus controller 40 generally communicates through a non-SAS protocol, such as another well-known communication protocol known as GSA. GSA is typically carried over an Ethernet network, and thus the bonus controller 40 includes an Ethernet transceiver, which is described with reference to FIG. 4 below. Because the bonus controller 40 communication may be Ethernet based, a switch 30 may be used to extend the number of devices that may be coupled to the bonus controller 40. The bonus controller 40 and/or the MID 20 may create or convert data or information received according to a particular protocol, such as SAS, into data or information according to another protocol, such as GSA. In this way the MID 20 and bonus controller 40 are equipped to communicate, seamlessly, between any EGM 10 and gaming network 50 no matter which communication protocols are in use. Further, because the MID 20 and bonus controller 40 are programmable, and include multiple extensible communication methods, as described below, they are capable of communicating with EGMs 10 that will communicate using protocols and communication methods developed in the future.

Other games or devices on which games may be played are connected to the gaming network using other connection and/or communication methods. For instance, an EGM 12 may couple directly to the network 50 without any intervening hardware, other than hardware that is built into the EGM 12 to connect it to the network 50. Likewise, a player kiosk 14 may be directly coupled to the gaming network. The player kiosk 14 allows players, managers, or other personnel to access data on the gaming network 50, such as a player tracking record, and/or to perform other functions using the network. For example, a player may be able to check the current holdings of the player account, transfer balances, redeem player points for credits, cash, or other merchandise or coupons, such as food or travel coupons, for instance.

A wireless transceiver 32 couples the gaming network 50 to a wireless EGM 36, such as a handheld device, or, through a cell phone or other compatible data network, the transceiver 32 connects to a cellular phone 34. The cellular phone 34 may be a "smart phone," which in essence is a handheld computer capable of playing games or performing other functions on the gaming network 50, as described in some embodiments of the invention.

The gaming network 50 also couples to the internet 70, which in turn is coupled to a number of computers, such as the personal computer 72 illustrated in FIG. 1. The personal computer 72 may be used much like the kiosk 14, described above, to manage player tracking or other data kept on the gaming network 50. More likely, though, is that the personal computer 72 is used to play actual games in communication with the gaming network 50. Player data related to games and other functions performed on the personal computer 72 may be tracked as if the player were playing on an EGM 10.

In general, in operation, a player inserts a starting credit into one of the games, such as an EGM 10. The EGM 10 sends data through its SAS or other data communication port through the MID 20 and/or bonus controller 50 to the gaming network 50. Various servers 60 and databases 70 collect information about the gameplay on the EGM 10, such as wagers made, results, various pressing of the buttons on the EGM 10, for example. In addition, the SAS port on the EGM 10 may also be coupled, through the MID 20 as described below, to other systems, such as player tracking systems, accounting, and ticketing systems, such as Ticket-In-Ticket-Out (TITO) systems.

In addition, the EGM 10 accepts information from systems external to the EGM itself to cause the EGM 10 to perform other functions. For example, these external systems may drive the EGM 10 to issue additional credits to the player. In another example, a promotional server may direct the EGM 10 to print a promotional coupon on the ticket printer of the EGM.

The bonus controller 40 is structured to perform some of the above-described functions as well. For example, in addition to standard games on the EGM 10, the bonus controller 40 is structured to drive the EGM 10 to pay bonus awards to the player based on any of the factors, or combination of factors, related to the EGM 10, the player playing the EGM 10, particular game outcomes of the game being played, or other factors.

In this manner, the combination of the bonus controller 40 and MID 20 are a sub-system capable of interfacing with each of the EGMs on a gaming network 50. Through this interface, the MID 20 may gather data about the game, gameplay, or player, or other data on the EGM 10, and forward it to the bonus controller 40. The bonus controller 40 then uses such collected data as input and, when certain conditions are met, sends information and/or data to the EGM 10 to cause it to perform certain functions.

In a more detailed example, suppose a player is playing an EGM 10 coupled to the MID 20 and the bonus controller 40 described above. The player inserts a player tracking card so the gaming network 50 knows the player identity. The MID 20 also stores such identifying information, or perhaps stores only information that the player is a level-2 identified player, for instance. The MID 20 passes such information to the bonus controller 40, which has been programmed to provide a welcome-back bonus to any level-2 player after he or she has played two games. Gameplay on the EGM 10 continues and, after the player plays two games, the bonus controller 40 instructs the EGM 10 to add an additional 40 credits to the EGM 10 as the welcome-back bonus. Such monitoring and control of the EGM 10 can occur in conjunction with, but completely separate from any player tracking or bonusing function that is already present on the gaming network 50. In other words, the server 60, when structured at least in part as a bonusing server, may be set to provide a time-based bonus of 10 credits for every hour played by the player of the EGM 10. The above-described welcome-back bonus may be managed completely separately through the bonus controller 40 and MID 20. Further, all of the actions on the EGM 10 caused by the bonus controller 40 are also communicated to the standard accounting, tracking, and other systems already present on the gaming network 50.

Figure 2:
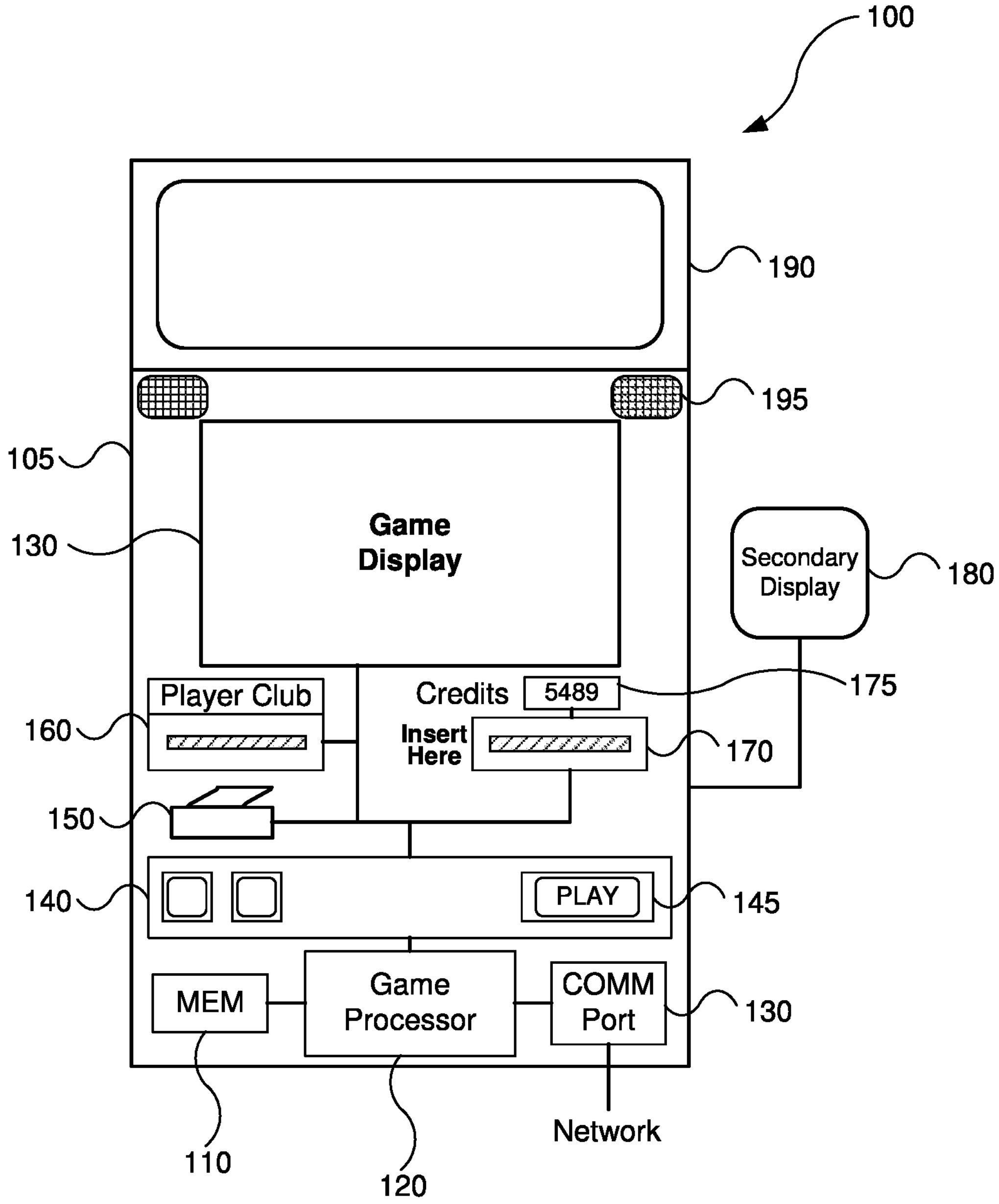
FIG. 2 is a functional block diagram that illustrates an example gaming device that can be a part of the gaming system shown in FIG. 1.

FIG. 2 is a functional block diagram that illustrates an example gaming device that can be a part of the gaming system shown in FIG. 1. Referring to FIG. 2, the illustrated gaming device 100 is an example of the EGMs 10, 12 that are shown in FIG. 1. These EGMs 10, 12 may include all types of electronic gaming machines, such as physical reel slot machines, video slot machines, video poker gaming devices, video blackjack machines, keno games, and any other type of devices may be used to wager monetary-based credits on a game of chance. As mentioned above, various other types of gaming devices may be connected to the network 50 (FIG. 1) such as wireless gaming devices 36, computers used for gaming purposes 72, cellular phones 34, multi-player gaming stations, server-based gaming terminals, etc.

Returning to FIG. 2, the illustrated gaming device 100 includes a cabinet 105 to house various parts of the gaming device 100, thereby allowing certain components to remain securely isolated from player interference, while providing access to player input/output devices so that the player may interact with the gaming device. The securely housed components include the game processor 120, memory 110, and connection port 130. The game processor 120, depending on the type of gaming device 100, may completely or partially control the operation of the gaming device. For example, if the gaming device 100 is a standalone gaming device, game processor 120 may control virtually all of the operations of the gaming device and attached equipment. In other configurations, the game processor 120 may implement instructions generated by or communicated from a remote server (e.g., server 60 shown in FIG. 1) or other controller. For example, the game processor 120 may be responsible for running a base game of the gaming device 100 and executing instructions received over the network 50 from a bonus server or player tracking server. In a server-based gaming environment, the game processor 120 may simply act as a terminal to perform instructions from a remote server that is running game play on the gaming device 100.

The memory 110 is connected to the game processor 120 and may be configured to store various game information about gameplay or player interactions with the gaming device 100. This memory may be volatile (e.g., RAM), non-volatile (e.g., flash memory), or include both types of memory. The connection port 130 is also connected to the game processor 120. This connection port 130 typically connects the gaming device 100 to a gaming network, such as the gaming network 50 described above. The connection port 130 may be structured as a serial port, parallel port, Ethernet port, optical connection, wireless antenna, or any other type of communication port used to transmit and receive data. Although only one connection port 130 is shown in FIG. 1, the gaming device 100 may include multiple connection ports. As described above, in many existing gaming devices, this connection port 130 is a serial connection port utilizing a SAS protocol to communicate to one or more remote game servers, such as player tracking servers, bonus servers, accounting servers, etc.

The player input/output devices housed by the gaming cabinet 105 include a game display 130, a button panel 140 having one or more buttons 145, a ticket printer 150, a bill/ticket reader 170, a credit meter 175, a player club interface device 160, and one or more game speakers 195. Various gaming devices may include fewer or more input/output devices (e.g., a game handle, a coin acceptor, a coin hopper, etc.) depending upon the configuration of the gaming device.

The gaming display 130 may have mechanical spinning reels, a video display, or include a combination of both spinning reels and a video display, or use other methods to display aspects of the gameplay to the player. If the gaming display 130 is a video display, the gaming display may include a touch screen to further allow the player to interact with game indicia, soft buttons, or other displayed objects. The button panel 140 allows the player to select and place wagers on the game of chance, as well as allowing the player to control other aspects of gaming. For example, some gaming devices allow the player to press a button 145 to signal that he or she requires player assistance. Other buttons may bring up a help menu and/or game information. The buttons 145 may also be used to play bonuses or make selections during bonus rounds.

Ticket printers 150 have relatively recently been included on most gaming devices to eliminate the need to restock coin hoppers and allow a player to quickly cash-out credits and transfer those credits to another gaming device. The tickets can also typically be redeemed for cash at a cashier cage or kiosk. The ticket printers are usually connected to the game processor and to a remote server, such as a TITO server to accomplish its intended purpose. In gaming devices that have more than one peripheral device, and which include only a single SAS port, the peripheral devices all share communication time over the connection port 130.

Another peripheral device that often requires communication with a remote server is the player club interface device 160. The player club interface device 160 may include a reader device and one or more input mechanisms. The reader is configured to read an object or indicia identifying the player. The identifying object may be a player club card issued by the casino to a player that includes player information encoded on the card. Once the player is identified by a gaming device, the player club interface device 160 communicates with a remote player server through the connection port 130 to associate a player account with the gaming device 100. This allows various information regarding the player to be communicated between the gaming device 100 and the player server, such as amounts wagered, credits won, and rate of play. In other embodiments, the card reader may read other identifying cards (such as driver licenses, credit cards, etc.) to identify a player. Although FIG. 2 shows the reader as a card reader, other embodiments may include a reader having a biometric scanner, PIN code acceptor, or other methods of identifying a player so as to pair the player with their player tracking account. As is known in the art, it is typically advantageous for a casino to encourage a player to join a player club since this may inspire loyalty to the casino, as well as give the casino information about the player's likes, dislikes, and gaming habits. To compensate the player for joining a player club, the casino often awards player points or other prizes to identified players during game play.

Other input/output devices of the gaming device 100 include a credit meter 175, a bill/ticket acceptor 170, and speakers 195. The credit meter 175 generally indicates the total number of credits remaining on the gaming device 100 that are eligible to be wagered. The credit meter 175 may reflect a monetary unit, such as dollars, or an amount of credits, which are related to a monetary unit, but may be easier to display. For example, one credit may equal one cent so that portion of a dollar won can be displayed as a whole number instead of decimal. The bill/ticket acceptor 170 typically recognizes and validates paper bills and/or printed tickets and causes the game processor 120 to display a corresponding amount on the credit meter 175. The speakers 195 play auditory signals in response to game play or may play enticing sounds while in an "attract-mode," when a player is not at the gaming device. The auditory signals may also convey information about the game, such as by playing a particularly festive sound when a large award is won.

The gaming device 100 may include various other devices to interact with players, such as light configurations, top box displays 190, and secondary displays 180. The top box display 190 may include illuminated artwork to announce a game style, a video display (such as an LCD), a mechanical and/or electrical bonus display (such as a wheel), or other known top box devices. The secondary display 180 may be a vacuum fluorescent display (VFD), a liquid crystal display (LCD), a cathode ray tube (CRT), a plasma screen, or the like. The secondary display 180 may show any combination of primary game information and ancillary information to the player. For example, the secondary display 180 may show player tracking information, secondary bonus information, advertisements, or player selectable game options. The secondary display may be attached to the game cabinet 105 or may be located near the gaming device 100. The secondary display 180 may also be a display that is associated with multiple gaming devices 100, such as a bank-wide bonus meter, or a common display for linked gaming devices.

In operation, typical play on a gaming device 100 commences with a player placing a wager on a game to generate a game outcome. In some games, a player need not interact with the game after placing the wager and initiating the game, while in other games, the player may be prompted to interact with the gaming device 100 during game play. Interaction between the player and the gaming device 100 is more common during bonuses, but may occur as part of the game, such as with video poker. Play may continue on the gaming device 100 until a player decides to cash out or until insufficient credits remain on the credit meter 175 to place a minimum wager for the gaming device.

Communication between gaming devices, such as those described above, and other devices on gaming systems 2 (FIG. 1) is becoming increasingly more complex. The below-described system illustrates a system and method of communication on modern and future gaming systems.

Figure 3A:
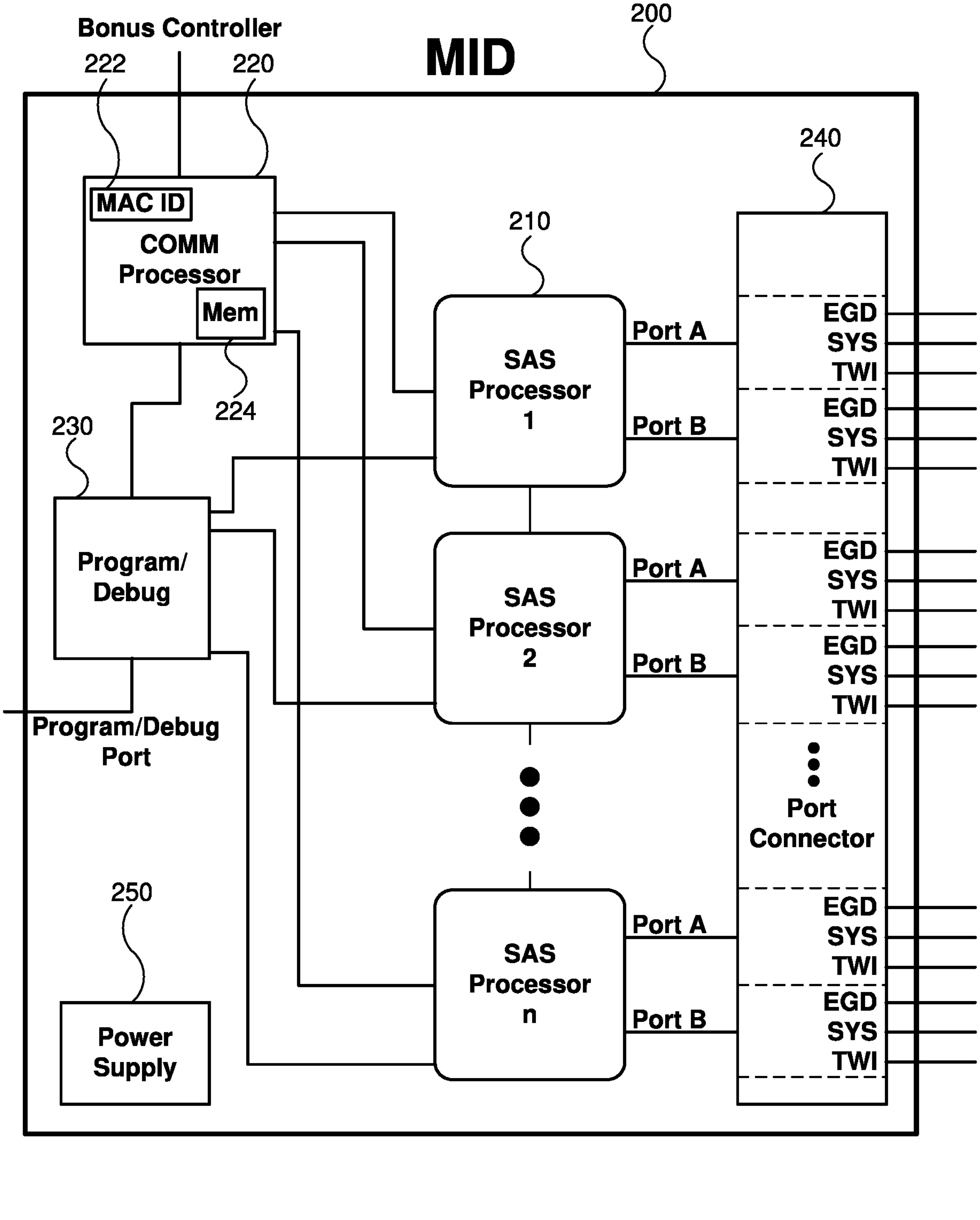
FIG. 3A is a block diagram of an example machine interface device shown in FIG. 1 according to embodiments of the invention.

FIG. 3A is a block diagram of a MID 200, which may be an example of the MID 20 described with reference to FIG. 1 above. The MID 200 includes a set of processors 210, which in this example are termed SAS processors. These SAS processors are capable of accepting, manipulating, and outputting data on a SAS protocol network.

The MID 200 is capable of communicating using other communication protocols as well, as described below. Each processor 210 is structured to couple to two Electronic Gaming Devices (EGDs). EGDs may include, for example, gaming devices such as EGM 10 of FIG. 1, or other electronic gaming devices. In the illustrated embodiment, each SAS processor 210 includes two ports, A and B, each of which may be coupled to an EGD. In turn, the two ports A and B are attached to a set of physical connectors, illustrated here as a single connector 240 for convenience of explanation. Each section of the physical connector 240, delineated by dotted lines, includes three separate pairs of communication lines. Each pair of communication lines is illustrated as a single line—a first serial pair labeled EGD, a second serial pair labeled SYS, and a third communication pair that uses two-wire communication, labeled TWI. Note that each of the ports A and B of the SAS processor 210 includes all three communication pairs. Additionally each of the sections of the physical connector 240 includes wires for a voltage and ground reference, though not depicted in FIG. 3A. In an embodiment of the MID 200 with four SAS processors 210, the physical connector 240 includes up to eight sections, each of which may be embodied by a separate, standard, RJ-45 connector to couple to a matching RJ-45 port in the connected EGM 10, or EGD, as determined by the specific implementation.

As illustrated in FIG. 3A, the first serial pair of Port A couples to EGD. The second serial pair may be coupled to external devices connected to the EGD, as needed. Specifically, some serial data protocols, such as SAS, do not allow EGMs 10 to interface with multiple external devices over a single serial communication path. Such external devices may include, for example, player tracking systems and accounting systems. If a particular EGM 10 is already connected to such a system, and thus its SAS port is "full," the MID 200, and in particular a SAS processor 210, may insert itself "between" the connected system and the EGM 10 by using both of the serial pairs in a particular port of the SAS processor 210 to couple to the EGM 10 and the other connected system, respectively. In operation, the MID 200, through the respective SAS processor 210, passes any information directed from the external device coupled to the SYS communication lines in a particular port to the EGD of the same port, or vice-versa, in real time and without interruption. For example, polls, requests for information, and transmission of information are passed from a connected player tracking system, through the SYS lines of Port A to the serial line EGD of Port A. Only a small communication delay is added using such a communication system, which is well within the tolerance limits of SAS protocol. As a result, both the EGM 10 and external system behave as if the MID 200 were not present.

Further, the third communication pair, a two-wire interface labeled TWI, presents opportunity for expansion to future systems installed on the EGM 10, or a new EGM, so that any data may be communicated between the EGM 10 and the MID 200. The TWI may be connected to card readers, top boxes, ticket dispensers, lighting panels, etc. that are coupled to or work in conjunction with an EGM 10.

Besides simply passing information between communication interfaces, the MID 200 also generates information directly for connected EGDs, which may originate from the MID 200 or from another device as described below. In such a case the SAS processor 210 sends the appropriate data through its appropriate serial line or two-wire interface directly to the desired EGD. Then the EGD may send its own data to its connected peripheral.

Referring back to FIG. 3A, the MID 200 additionally includes a communication processor 220, labeled as COMM processor. The communication processor 220 is coupled to each of the SAS processors 210, a program/debug circuit 230, and to a bonus controller 40 (FIG. 1). In practice, the communication processor 220 may be embodied by a small microprocessor, such as the Atmel ATXMEGA256A3, which is readily available to developers, or any other processor or system capable of performing the desired communication functions.

The communication processor 220 collects and aggregates information from the EGDs that are coupled to each of the SAS processors 210 and sends the aggregated information to the bonus controller 40 of FIG. 1. In some embodiments the communication processor 220 is coupled to the bonus controller 40 through an Ethernet interface. The communication processor is structured to parse information from Ethernet data packets and collect it for use by other systems within the MID 200. Because Ethernet is an addressed protocol, by which messages may be sent to a particular Ethernet address, the communication processor 220 also includes an address of the Ethernet device in a MAC ID 222.

The communication processor 220 may also accept information from the bonus controller 40, or other connected devices, and pass such information to the EGDs coupled to the SAS processors 210. The information may include data, instructions, or commands, for instance.

A memory 224, which may be, for instance Ferroelectric Random Access Memory (FRAM) capable of retaining stored contents for over 10 years may be used by the communication processor for both program and data storage. Of course, other memory technologies may be used instead of or in addition to FRAM.

A program/debug circuit 230 in the MID 200 connects to the communication processor 220 as well as to each of the SAS processors 210. During manufacture of the MID 200, the programming functions of the program/debug circuit 230 load program code to each of the SAS processors 210 as well as the communication processor 220. This initial loading may take place through a program/debug communication port. Further, the program codes stored in each of the SAS processors 210 and the communication processor 230 may be updated through commands and data sent from an external device, such as the bonus controller 40, through the communication processor 220 to the program/debug circuit 230. The program/debug circuit 230 then formats the updated program data for each of the connected SAS processors 210 and communication processor 220, and sends a command to each of the processors to be updated to load the new program code.

Figure 3B:
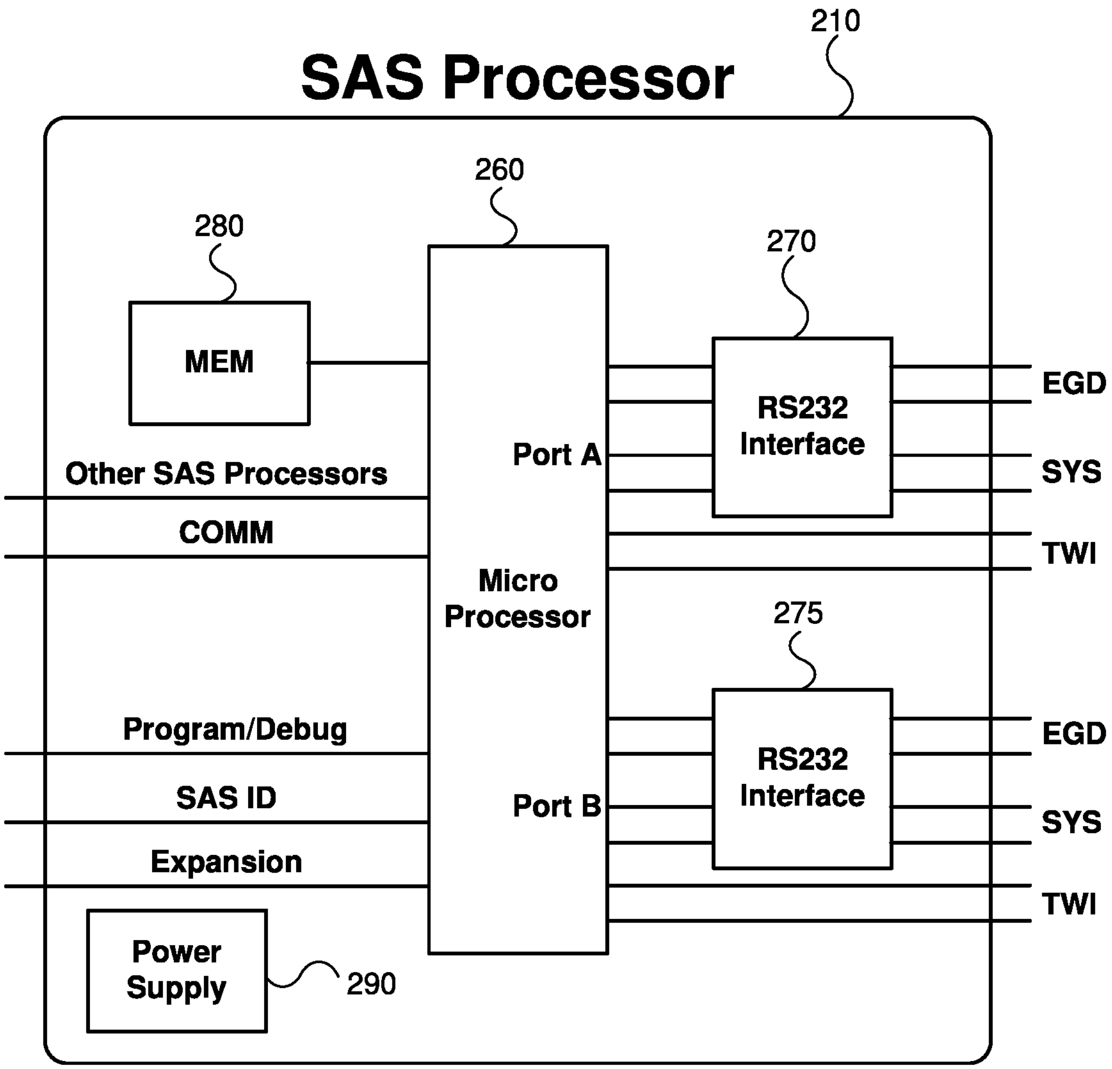
FIG. 3B is a block diagram of an example processor in the machine interface device illustrated in FIG. 3A according to embodiments of the invention.

FIG. 3B is a block diagram of one of the SAS processors 210 of FIG. 3A, which shows additional detail of the SAS processor.

As described above, each of the SAS processors 210 include two separate ports, Port A and Port B, illustrated here as separate ports of a microprocessor 260. The microprocessor 260 in the SAS processor 210 may be embodied by an Atmel ATXMEGA256A3, as described above.

Each of the ports of the microprocessor 260 is structured to couple to an EGD, which may be an EGM 10 of FIG. 1. Each port of the microprocessor 260 includes two serial connections, which in the example embodiment illustrated in FIG. 3B, are RS-232 ports common in the computing industry. The RS-232 ports are contained in an RS-232 interface 270, 275, one for each port of the microprocessor 260. Each of the interfaces 270, 275 includes two separate RS-232 ports, each of which uses a separate transmit and receive wire. Thus, each interface 270, 275 includes a total of four wires. It is convenient to include RS-232 ports as the preferred mode of communication because it is the standard interface for SAS ports of the EGMs 10. In non-standard EGMs 10, such as very old or future devices that may not include SAS ports, communication ports other than RS-232 may be used simply by exchanging or updating the RS-232 interfaces 270, 275. Another possibility is to include an RS-232 translator in any EGM 10 that does not include its own RS-232 interface. As illustrated in FIG. 3B, and as described above, the first of the serial connections, labeled EGD, is connected to an EGD for the particular port of the microprocessor 260, while the second serial connection, labeled SYS is connected to external devices that may be coupled to the particular EGD.

Additionally, and as described above, each SAS processor 210 includes two, two-wire interfaces, illustrated as a separate interface pair and labeled as TWI. In this embodiment, there is one pair for each port of the microprocessor 260. Each two-wire interface creates a bi-directional serial port that may be used for communicating with peripheral or expansion devices associated with the EGD of the particular microprocessor 260, or with other devices on the gaming system 2 of FIG. 1.

The SAS processor 210 includes a memory 280 for storing instruction data of the microprocessor 260 as well as providing data storage used by the SAS processor. The memory 280 is preferably non-volatile memory, such as FRAM that is connected to the microprocessor 260 through a serial interface.

As described above, the SAS processor 210 of the MIB 200 (FIG. 3A) includes multiple connections to other components in the MIB 200, which are illustrated in detail in FIG. 3B. Initially, each SAS processor 210 is coupled to each of the other SAS processors 210 in the MIB 200. In practice, this may accomplished by a direct connection, in which each microprocessor 260 is directly coupled to one another, or such connection may be an indirect connection. In an indirect connection, the microprocessors 260 of each SAS processor 210 is coupled to the communication processor 220 (FIG. 3A). Any data or information to be shared between SAS processors 210 is then originated by or passed through the communication processor 220 to the other SAS processors.

Similarly, as described above, the microprocessor 260 of each SAS processor 210 is coupled to a program/debug circuit 230 for initial or later programming.

To communicate with each SAS processor 210 individually, each SAS processor is given an individual identification number, which may be set for the microprocessor 260 by tying particular data pins of the microprocessor to permanent low or high signals. Using binary encoding, n individual lines are used to identify 2$n$ separate processors.

A set of expansion pins couples to the microprocessor 260 of each SAS processor 210 so that each processor may determine system identification and revisions of the MIB 200 and the connected bonus controller 40.

Figure 4:
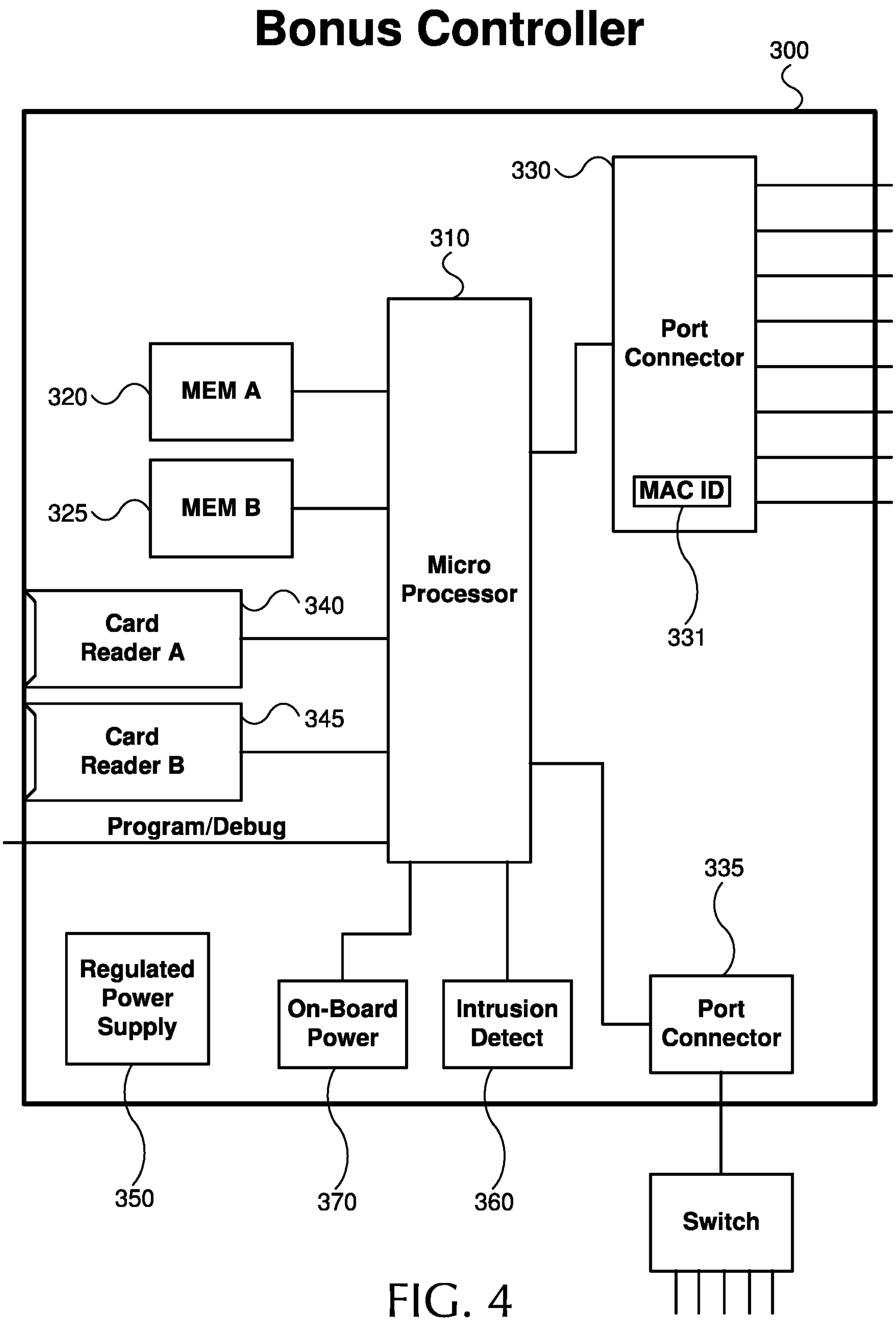
FIG. 4 is a block diagram of an example bonus controller shown in FIG. 1 according to embodiments of the invention.

With reference back to FIG. 1, recall that the bonus controller 40 couples to each of the MIDs 200, and by extension to their coupled EGDs, such as EGMs 10, and possibly to one or more EGMs themselves, to cause data and commands to be sent to the EGMs to control functions on each EGM. FIG. 4 is a detailed block diagram of such a bonus controller, according to embodiments of the invention.

A bonus controller 300 of FIG. 4 may be an embodiment of the bonus controller 40 illustrated in FIG. 1. Central to the bonus controller 300 is a microprocessor 310, which may be an Atmel AT91SAM9G20, which is readily available to developers.

The microprocessor 310 is coupled to one or more memory systems 320, 325. A memory system 320 is a 2 Megabyte FRAM while memory system 325 is a 64 Megabyte Synchronous DRAM (SDRAM). Each memory system 320, 325 has various advantages and properties and is chosen for those properties. FRAM maintains its data autonomously for up to ten years, while SDRAM is relatively fast to move data into and out of, as well as being relatively inexpensive. Of course, the sizes and types of memory included in any bonus controller according to embodiments of the invention may be determined by the particular implementation.

The microprocessor 310 also couples to a pair of card readers, 340, 345, which are structured to accept easily replaceable, portable memory cards, as are widely known. Each card reader may further include Electro-Static Discharge (ESD) devices to prevent damage to internal circuitry, such as the microprocessor 310, when cards are inserted or removed from the card readers 340, 345. In practice, a card in one of the card readers 340, 345 may store program code for the microprocessor 310 while a card in the other reader may store data for use by the bonus controller 300. Alternatively a single card in either of the card readers 340, 345 may store both program and data information.

A port connector 330 includes multiple communication ports for communicating with other devices. With reference back to FIG. 3A, the communication processor of each MID 200 couples to a connected bonus controller through such a communication port. The communication port 330 is preferably an Ethernet interface, as described above, and therefore additionally includes a MAC address 331. The port connector 330 includes multiple separate connectors, such as eight, each of which connect to a single MID 20 (FIG. 1), which in turn connects to up to eight separate EGMs 10. Thus, a single bonus controller 300 may couple to sixty-four separate EGMs by connecting through appropriately connected MIDs.

Further, a second port connector 335 may be included in the bonus controller 300. The second port connector may also be an Ethernet connector. The purpose of the second port connector 335 is to allow additionally connectivity to the bonus controller 300. In most embodiments the second port connector 335 may couple to another bonus controller 300 or to other server devices, such as the server 60 on the gaming network 50 of FIG. 1. In practice, the second port connector 335 may additionally be coupled to a MID 20, thus providing the bonus controller 300 with the ability to directly connect to nine MIDs 20.

Yet further, Ethernet connections are easily replicated with a switch, external to the bonus controller 300 itself, which may be used to greatly expand the number of devices to which the bonus controller 300 may connect.

Because the bonus controller 300 is intended to be present on a gaming network 50, and may be exposed to the general public, systems to protect the integrity of the bonus controller 300 are included. An intrusion detection circuit 360 signals the processor 310 if a cabinet or housing that contains the bonus controller 300 is breached, even if no power is supplied to the bonus controller 300. The intrusion detection circuit may include a magnetic switch that closes (or opens) when a breach occurs. The microprocessor 310 then generates a signal that may be detected on the gaming network 50 indicating that such a breach occurred, so that an appropriate response may be made. An on-board power circuit 370 may provide power to the bonus controller 300 for a relatively long time, such as a day or more, so that any data generated by the processor 310 is preserved and so that the processor 310 may continue to function, even when no external power is applied. The on-board power circuit 370 may include an energy-storing material such as a battery or a large and/or efficient capacitor. Similar to the microprocessor processor 260 of the SAS processor 210 described above, the microprocessor 310 of the bonus controller 300 is additionally coupled to a program/debug port for initially programming the microprocessor 310 during production, and so that program and/or other data for the microprocessor may be updated through the program/debug port. In operation the bonus controller 300 configures and controls bonus features on gaming devices through a gaming network 50 or through other communication systems. Bonus features are implemented through each gaming device's internal structure and capabilities, and may include integration with additional peripheral devices. Bonusing programs for the connected games may be introduced to the bonus controller 300 by updating data stored in the memory systems directly on the bonus controller, or by inserting new memory cards in one or more of the card readers 340, 345. Such a platform provides a facility for game developers, even third-party developers, to define and program new types of bonus games that may be used in conjunction with existing EGMs on existing gaming networks, or on new games and new networks as they are developed.

As discussed above, traditional approaches to designing game play on gaming devices include many limitations. Embodiments of the present invention are directed to gaming devices and gaming systems that are configured to implement event-based gaming operations. Here, a gaming device includes a game event list that has game outcomes associated with each entry in the game event list. In some embodiments, the game event list is generated before game play even begins on the gaming device by selecting general game outcome types or specific game outcomes for each of the entries in the game event list. During game play, a game counter is incremented to a next entry in the game event list and an associated game outcome is displayed on the gaming device during the gaming event.

As used in this application, the term "game event list" refers to a list or table that includes multiple entries to hold indications of game outcomes. This game event list may be stored in local memory at a gaming device, in a separate bonus controller that is used to direct at least some aspects of game play, or in a remote server or database that may be associated with either identified players or be associated with the game play occurring on the gaming device. Also in this application, when a "game outcome" is described as being in, written to, or otherwise associated with an entry in a game event list, the game outcome may refer to a generic type of game outcome, such as WINS or LOSSES, may refer to a specific game outcome, such as BAR BAR BAR, may refer to loss frequencies, such as 60%, or may refer to another aspect that is related to the ultimate display of a game outcome that is shown to the player on the game display.

There are many advantages of using game event lists over traditional game designing and playing methods. Some of these advantages include the ease of creating a paytable or paytables for a gaming device, the flexibility in introducing a variety of game play or bonus options, and the flexibility of customizing the game to a player or game condition. The discussion below is broken up into general sections to address different issues with event-based gaming. These sections are basics in game list generation, basics in game play with game event lists, and variations and advanced concepts that can be implemented with game event lists.

Game Event List Generation

At game initialization, a game event list is created. The list may be of any length and it is the list length, combined with the number of times a given event occurs within the list that determines the hit frequency of that event. In some embodiments, each entry in the game event list is a type of game outcome. For example, in one embodiment, there are only two types of entries in the game event list: WIN and LOSS. Bonuses and other features are also possible as game outcome types that can be included in other game event lists. However, these types of entries for game event lists are discussed below in the variation section.

For embodiments with only WINS and LOSSES in a game event list, the game event list provides a lot of flexibility in providing specific hit frequencies and payback percentages while being relatively easy to calculate. As discussed below, when playing a gaming device having a game event table, the WINS and LOSSES provide a type of game outcome that provides a guide for actual game outcome that is determined and displayed when a gaming event is initiated on the gaming device. In one example, suppose that a game designer wants to create a game with a 40% hit frequency and a 90% payback. Also, assume that the game designer decides to use a game event list with 10 entries or positions. Since a 40% hit frequency is desired, 4 out of the 10 entries will be WINS and the other 6 entries will be LOSSES. A resulting game list may resemble the list in Table 1 below.

TABLE 1

Example Game Event List

| ENTRY | GAME OUTCOME |
|---|---|
| 1 | Outcome Type |
| 2 | Outcome Type |
| 3 | Outcome Type |
| 4 | Outcome Type |
| 5 | Outcome Type |
| 6 | Outcome Type |
| 7 | Outcome Type |
| 8 | Outcome Type |
| 9 | Outcome Type |
| 10 | Outcome Type |

With a desired hit frequency of 40% and a desired payback percent of 90%, the game designer can quickly calculate that the average pay of a WIN (or winning outcome) should be 2.25 (0.9/0.4). With this information, the game designer may develop the following paytable for the game as shown in Table 2 below.

TABLE 2

Base Game Example Paytable

| PAYTABLE | PAY FOR A WAGER OF 10 |
|---|---|
| XX XX XX | 0 |
| XX XX CH | 5 |
| AB AB AB | 10 |
| 1B 1B 1B | 20 |
| 2B 2B 2B | 30 |
| 3B 3B 3B | 50 |
| 7 7 7 | 100 |
| JP JP JP | 1000 |
| AVG. PAY | 22.5 (225%) |

Here, average pay of the paytable may be achieved by weighting each paytable outcome that has an associated award or pay. During game play, the game event list may be populated with WIN and LOSS entries. A resulting game event list may resemble the list shown below in Table 3.

TABLE 3

Example Game Event List

| ENTRY | GAME OUTCOME |
|---|---|
| 1 | LOSS |
| 2 | WIN |
| 3 | LOSS |
| 4 | LOSS |
| 5 | WIN |
| 6 | LOSS |
| 7 | LOSS |
| 8 | LOSS |
| 9 | WIN |
| 10 | WIN |

One method of generating a game event list according to embodiments of the invention is described below with reference to FIG. 5A.

Figure 5A:
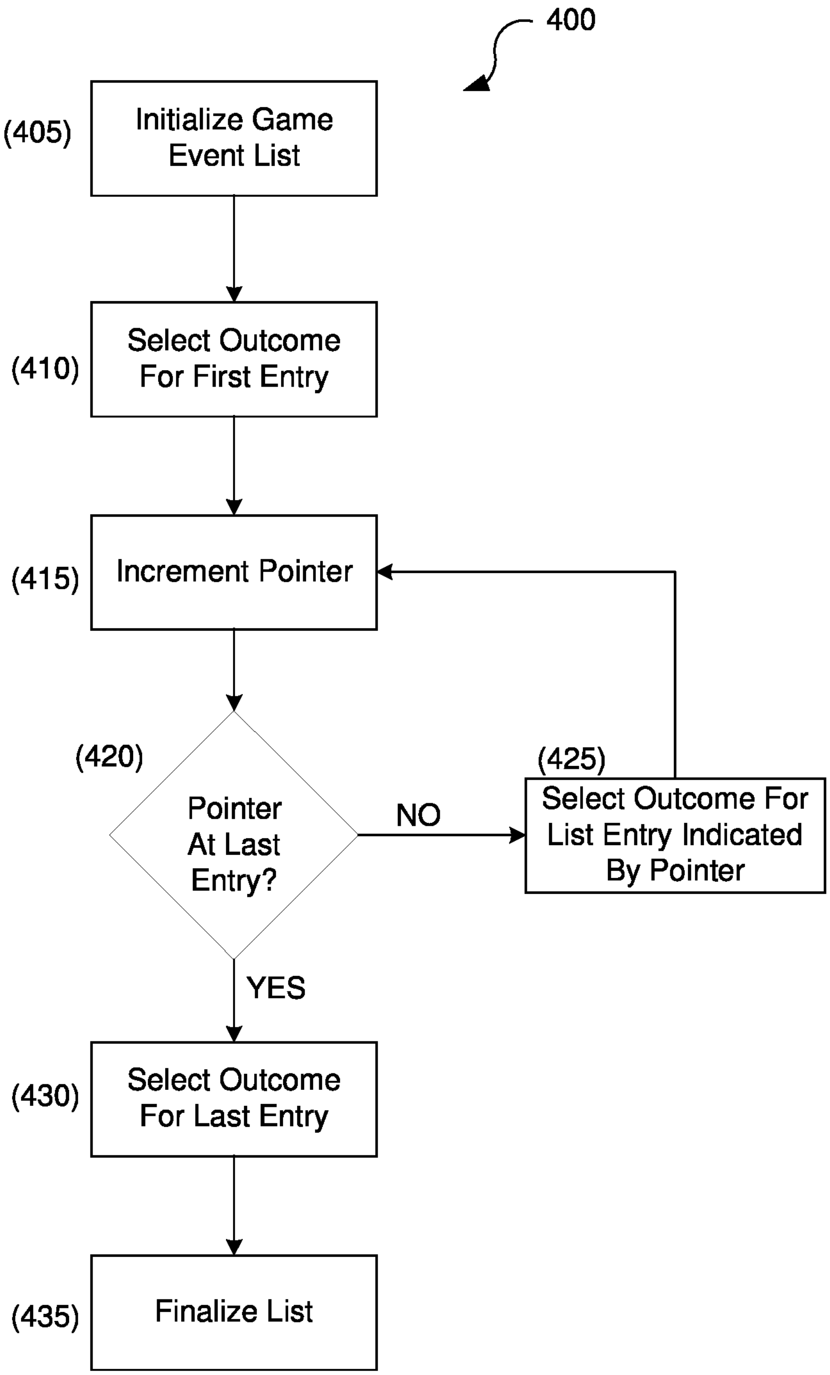
FIG. 5A is a flow diagram of a method of generating an event list for a gaming device according to embodiments of the invention.

Referring to FIG. 5A, flow 400 begins with process 405 where a game event list is initialized. Initializing a game event list may include defining a length or number of entries in a game event list. In the above example, the game event list was set at 10 entries. However, in other embodiments, the list size may be variable. A game designer or casino operator may define a maximum and/or minimum size for game event lists. Here, the length of the game list may be defined at the time that the game list is generated. Initializing a game event list may also include associating the game list with an identified player. For example, suppose that an identified player begins play on a particular game device. A game event list generated for the present game session may be associated with the player, and may be stored in a player database and associated with a player loyalty account for the identified player. Here, if the player stops play of the gaming device before the end of a game event list, the game list may be saved in the player database and retrieved the next time the identified player plays the same or similar game. Initializing a gaming device may also include associating the game event list with a particular wager amount. As discussed below, associating a particular game event list with a particular wager may prevent players from varying wager sizes to take advantage of certain list distribution properties. A list pointer may also be initialized or set to point to a first position in the game event list.

After the game event list has been initialized, flow 400 proceeds to process 410 where a game outcome is selected for the first entry in the game event list. In the above example shown in Table 3, a LOSS outcome was selected for the first entry in the game event list. A list pointer may then be incremented so that it points to the next entry in the game event list in process 415. In the above example, the pointer is incremented from 1 to 2 so that it points to the second entry in the game event list.

In process 420 it is determined if the pointer is pointing to the last entry in the game event list. Following the above example again, the pointer is pointing to the second entry, which is not the last entry in the game event list. If the pointer is not pointing to the last entry in the gaming event list, flow 400 proceeds to process 425 where another game outcome is selected for the list entry indicated by the pointer. From process 425, flow 400 proceeds back to process 415 and repeats processes 415, 420, and 425 until all but one of the entries in the game event list are filled with game outcomes.

When it is determined that the pointer is pointing to the last entry in the game event list in process 420, flow 400 proceeds to process 430 where a final outcome is selected for the last entry in the game event list. In process 435, the game event list is finalized. In this process, the game event list may be saved to particular location, such as in a memory section a gaming device, or in a player database location. Finalizing may also include checking the list for any errors, confirming that distribution conditions have been met, or implementing any bonuses into the game event list, such as bonus spins, as discussed below.

Figure 5B:
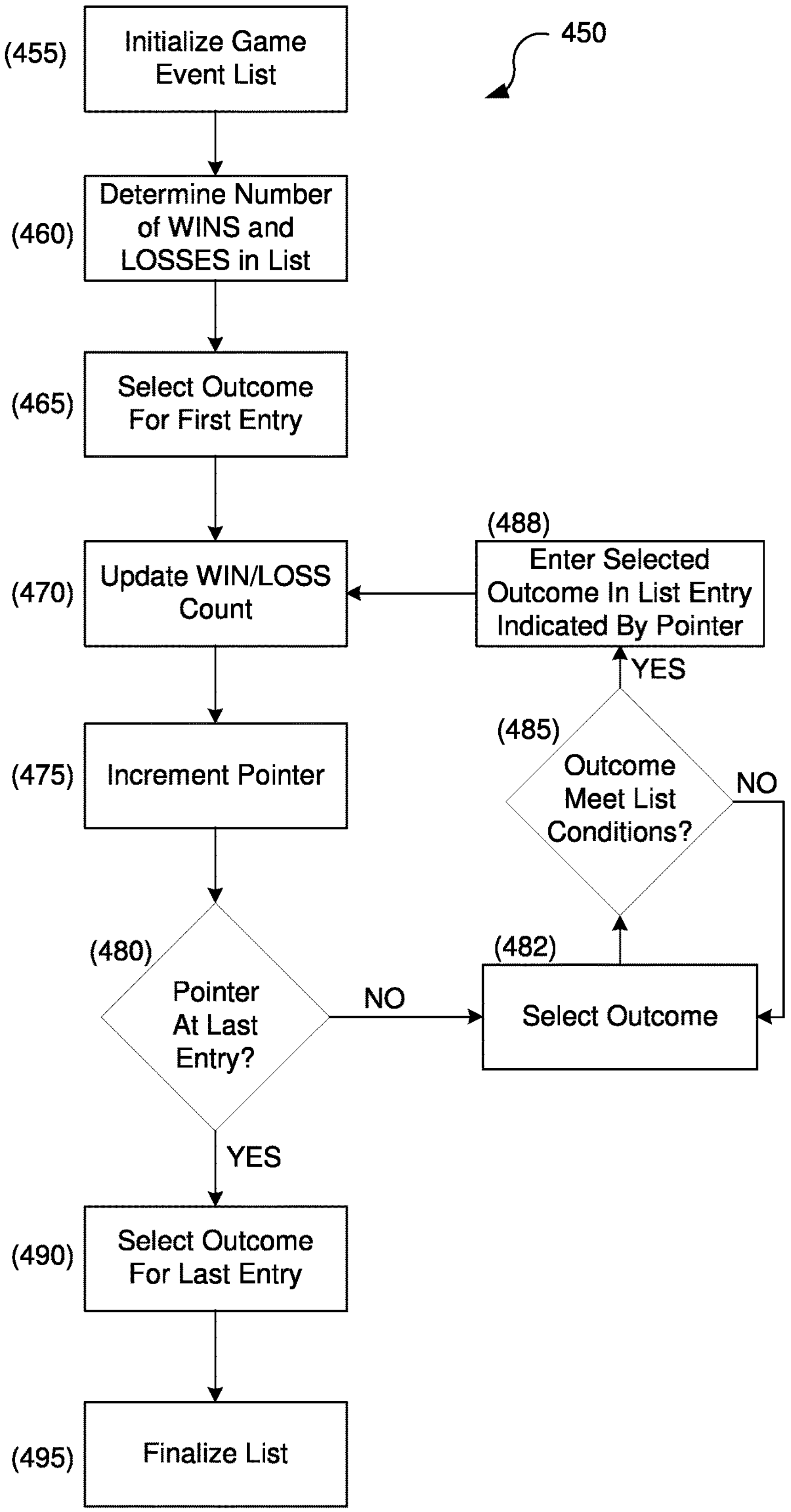
FIG. 5B is a flow diagram of another method of generating an event list for a gaming device according to embodiments of the invention.

FIG. 5B is a flow diagram of another method of generating an event list for a gaming device according to embodiments of the invention.

Many of the processes in this alternate method shown in FIG. 5B are similar to processes described above for FIG. 5A. Hence, details about these similar processes will not be repeated. Referring to FIG. 5B, flow 450 begins with process 455 where a game event list is initialized. In process 460, the number of WINS and LOSSES are determined. In the above example, a 40% hit frequency has desired, which translated to 4 WINS and 6 LOSSES in the 10 entry game event list. In process 465 a game outcome is selected for a first entry. In process 470, the WIN/LOSS counts are updated. In the above example, a LOSS was selected as the first entry. Hence, the WIN/LOSS counts would be updated to reflect that 4 WINS are still available and 5 LOSSES are still available to implement in the game event list.

The game pointer is incremented in process 475 and it is determined whether the pointer is pointing at the last entry in the game event list in process 480. If the pointer is not pointing to the last entry in the game event list, a game outcome is selected in process 482. It is then determined whether this selected outcome meets the list conditions in process 485. Here, it may be ensured that the selected game outcome does not violate a predefined list condition. For example, if there were no WINS left in the WIN count, a selected game outcome of another WIN would violate a condition for the game list. Additionally, if a distribution condition existed that specified that no more than 3 LOSSES could occur in a row, and a selected outcome was going to be the fourth LOSS in a row in a game event list, process 485 would recognize that this selected game outcome violated a condition for the game event list.

If a selected game outcome does not meet the list conditions as determined in process 485, flow 450 returns to process 482 to select a new game outcome. These processes are repeated until a selected game outcome meets the predefined conditions for the game event list. When the selected game outcome is determined to meet the list conditions in process 485, flow 450 proceeds to process 488 where the selected outcome is entered into the game event list entry position indicated by the pointer. Flow 450 then returns to process 470, where the WIN/LOSS counts are updated. Processes 470, 475, 480, 482, 485, and 488 are repeated until all but one entry has been determined for the game event list.

When process 480 determines that the pointer is pointing to a last entry in a game event list, flow 450 proceeds to process 490 where a final game outcome is placed in the last entry position in the game event list. In some embodiments, the last of the WIN/LOSS count outcomes may be directly placed into the last entry. In other embodiments, flow 450 may include processes similar to processes 482, 485, and 488 to select a final game outcome and ensure that the outcome meets the list conditions. The list is then finalized in process 495.

In another method of generating a game event list, the known values of WINS and LOSSES may be implemented in a game event list and randomly shuffled to generate a filled game event list that is ready for game play. The steps of this process may be similar to those described in FIGS. 5A and 5B except that a random shuffle routine may be used to mix up the order of WINS and LOSSES.

The above game event list embodiments only determine game outcome types to put in the game event list. The actual game outcomes that are displayed to the player may be chosen at the time when a game event corresponding to an entry value is initiated by the player. However, in other embodiments, the winning outcome values or all outcome values may be determined and inserted into a game event list prior to game play as shown in Tables 4 and 5 below.

TABLE 4

Example Game Event List With Specific Win Outcomes

| ENTRY | GAME OUTCOME |
|---|---|
| 1 | LOSS |
| 2 | 2B 2B 2B |
| 3 | LOSS |
| 4 | LOSS |
| 5 | XX XX CH |
| 6 | LOSS |
| 7 | LOSS |
| 8 | LOSS |
| 9 | 1B 1B 1B |
| 10 | 7 7 7 |

TABLE 5

Example Game Event List With Specific Outcomes

| ENTRY | GAME OUTCOME |
|---|---|
| 1 | 1B bb 2B |
| 2 | 2B 2B 2B |
| 3 | bb bb 7 |
| 4 | CH 2B bb |
| 5 | 7 bb CH |
| 6 | 3B 7 bb |
| 7 | 1B bb 3B |
| 8 | 7 7 bb |
| 9 | 1B 1B 1B |
| 10 | 7 7 7 |

Here, bb represents a blank or space in the reel strip. As shown in these Tables, actual game outcomes that are to be displayed during game play can be determined and implemented into the game event tables.

In yet other embodiments, game event lists may be generated with loss frequency values. Here, instead of game outcome types or specific game outcomes being implemented into a game event list, a probability value is inserted into the list that corresponds to the probability that a game outcome associated with a specific entry is a losing outcome (or the reverse could be done with winning frequency values). An example game event list may look list the one shown in Table 6 below.

TABLE 6

Example Game Event List With Loss Frequency Values

| ENTRY | LOSS FREQ GAME OUTCOME |
|---|---|
| 1 | 60% |
| 2 | 90% |
| 3 | 10% |
| 4 | 50% |

TABLE 6-continued

Example Game Event List With Loss Frequency Values

| ENTRY | LOSS FREQ GAME OUTCOME |
|---|---|
| 5 | 60% |
| 6 | 90% |
| 7 | 90% |
| 8 | 5% |
| 9 | 10% |
| 10 | 45% |

The values shown in Table 6 correspond to an overall hit frequency of 40% (or a loss frequency of 60%). Here, the loss frequency values influence, but do not predetermine game outcomes for each game played. For example, a 90% loss frequency value may typically lead to losses being received by the player (i.e., the player has a 1 in 10 chance of receiving a winning outcome when that corresponding entry in the game event list is played in a gaming session). On the other hand, a 5% or 10% loss frequency value may typically lead to wins. Loss frequency values may be determined using calculations and/or ranges in generating a game event list. Alternatively, predetermined sets of loss frequency values may be used and their values shuffled to generate game event lists with particular characteristics (e.g., low volatility or high volatility).

This leads to another advantage of using game event lists in game play. They are highly customizable to provide certain game play characteristics. For example, suppose that a game was designed so that it did not have 8 losses happen in a row. Conditions may be set on game event lists (assume the game event list had 100 entries or more) to prevent 8 losses from occurring in a row. Additionally, player characteristics may determine what customization is implemented. For example, suppose a particular player prefers highly volatile games. Conditions may be set that provide game event lists with a lower hit frequency, but with much larger pays for wins. These conditions may be designed and preset by a game designer or be dynamically implemented on a game when certain parameters are set by a casino operator, set by a player, or automatically set in response to a player's measured behavior while playing games. Since game event list generation is periodically occurring, creating a new type of game event list or modifying an exiting game event list is relatively simple to carry out.

Customization may also be used to entice newer players and make them feel comfortable on new games, reward players that very high wager amounts, or otherwise bonus certain players. Additionally, customization may be carried out for play at certain times of the day or certain days of the week. For example, higher payback percentage and lower volatilities may be implemented during weekday afternoons. Related co-pending application Ser. No. 12/981,091, entitled MEANS FOR ENHANCING GAME PLAY OF GAMING DEVICE discusses several different scenarios where customizing or personalizing a game session through bonus spins is desirable. Similar situations may be contemplated in customizing or personalizing game event lists.

When the game event list is exhausted (index or pointer reaches the end of the list) a new event list may be generated. Conditions and customizations may be carried over from a previous game event list or a process may be carried out to determine if any of these conditions or customizations should be modified. For example, if a particularly rich (high payback %) gaming event list is initially used for a new player, the end of the game event list may signal an end to the higher payback %. Hence, the new game event list generated for that player may use a different goal payback percentage. Weights within the paytable, hit frequency requirements, WIN/LOSS distributions, and other conditions may be modified to customize particular game event lists.

Since game event lists can predefine when wins will occur, at least over the length of the event list, players may try to take advantage of certain list characteristics. In some implementations, the event list will also contain bonus occurrences that are partly or fully funded by previous play. Thus, it may be necessary to prevent players from implementing a bet size strategy that gives them an edge. To ensure that this does not happens, a separate event list may be maintained for each game and each allowed bet size within that game.

For example, a game is implemented as a 1 cent denomination with six allowed wager sizes: 25, 50, 100, 200, 500 and 1,000 credits. Separate event lists are generated and maintained for each wager size (in this case, 6 event lists). Whenever a player switches from one bet size to another, they automatically switch from one event list to another.

Event List Game Play

Game play with a game event list may appear identical to traditional game play from a player's perspective. Theoretically, it provides the same values that traditional game player provides. However, the game event list provides some advance information about what may or will occur during game play. That is, game event lists provide game outcome types, actual game outcomes, or outcome influencing values that shape how a gaming session will unfold. In operation, the game play just proceeds down the entries of a game event list making any necessary calculations or determinations as needed. The list is implemented through use of an index or game counter, which is initialized to zero. When the next game is played, the index is incremented and the outcome held at the indexed location in the event table is executed. If an index begins at zero, its first incremented value is 1. The game then takes the outcome at position 1 and implements it. In the above example, in reference to Table 3, the first outcome is a LOSS. Here, the game device selects and displays a losing game outcome to the player.

On the next wager, the index is again incremented, and is now 2. That position on the event list contains a WIN. Now the game executes a routine to determine the winning outcome. This routine uses a weighted paytable, such as the paytable shown in Table 1, which contains any number of symbols and pay values. This paytable is not based on reel positions. It simply selects one of the pluralities of possible outcomes (symbols and value) in accordance with a predefined weighting of the likelihood of each outcome in relation to the others.

In this example, the list-base gaming method only executes the weighted paytable when a WIN event occurs and the pay determination must include the average number of wagers required for each WIN event. Here the hit frequency is 40%, which means a win occurs every 2.5 games played on average. The weighted paytable selects a payout value based upon a value of 2.5× the current wager. In embodiments where a specific game outcome is inserted into the game event table, the gaming device may simply display the value included in the game event list and not need to use the weight paytable. Note that the weighted paytable is used in the generation of the game event list rather than during game play. In embodiments that use loss frequency values in the game event table, two routines may be carried out during game play. First, the loss frequency value may be used to determine if the game outcome is a WIN or a LOSS. Next, the weighted paytable is used to determine the actual value of a WIN outcome, while a losing outcome may be randomly or otherwise selected for a LOSS outcome.

Figure 6:
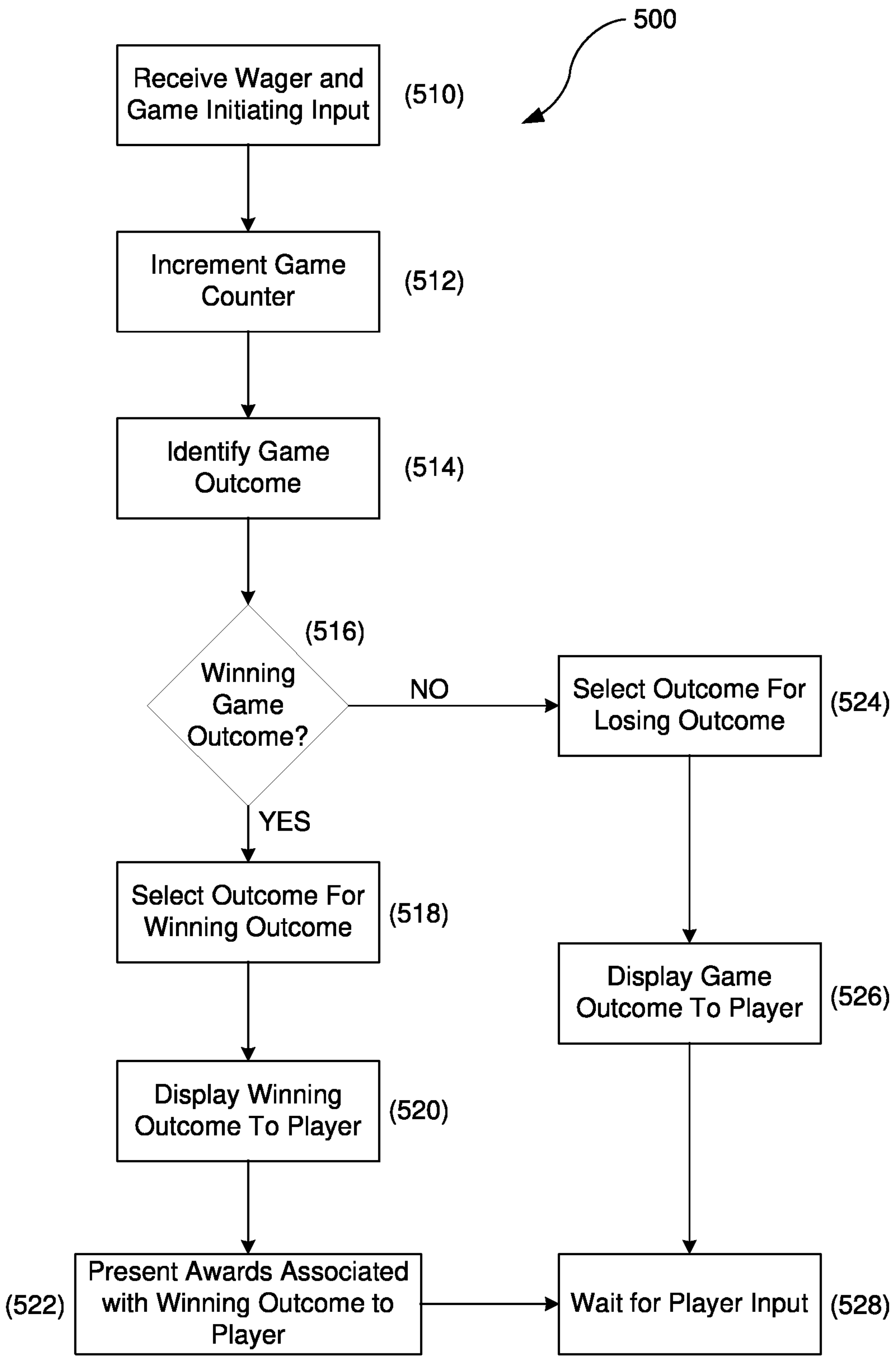
FIG. 6 is a flow diagram of a method of operating a gaming device using an event list according to embodiments of the invention.

FIG. 6 is a flow diagram of a method of operating a gaming device using an event list according to embodiments of the invention. Specifically, FIG. 6 refers to embodiments of a method of implementing an event list in game play that includes game outcome types, such as the game event list shown above in Table 3. However, similar processes may be used to implement game event lists that hold actual game outcomes or loss frequency values.

Referring to FIG. 6, flow 500 begins by receiving a wager and game initiating input in process 510. In process 512, the gaming device increments a game counter associated with the game event list. The gaming device then identifies a game outcome associated with a an entry in the game event list indicated by the game counter in process 514. In process 516, the gaming device determines whether the identified game outcome is a winning outcome. If the identified game outcome is not a winning game outcome, the gaming device may select a losing outcome in process 524 and display the selected losing outcome to the player in process 526 as discussed above. If the identified game outcome is a winning game outcome, the gaming device selects a winning outcome from the weighted paytable in process 518 and displays the winning outcome in process 520 as discussed above. After either a winning or losing game outcome has been displayed to the player in either of process 526 or 520, the gaming device may then wait for further player input in process 528.

Game Event Variations

As mentioned above, one of the advantages of using game event lists is the ease of customizing them to influence game play. This can be accomplished, as discussed above, by manipulating distributions of outcomes on the game event list or changing characteristics of the game event list, such as hit frequencies, paytable weighting, or other conditions. Additionally, various other features may be implemented with game event lists to provide variations in game play, player bonuses, and payback percentage manipulations.

In one variation, loss insertions may be used to manipulate or fine tune payback percentages. Loss insertions are discussed in detail in co-pending application Ser. No. 12/981,048, entitled EVENT-BASED GAMING OPERATION FOR GAMING DEVICE. Here, losses may be inserted outside of typical game play to adjust payback percents or customize/personalize game play. With game event lists, loss insertions may be carried out independently of the game outcomes listed in the game event list. That is, a loss insertion determination may be done immediately when a game initiating input is received and prior to a game counter incrementing or a entry on a game event list examined. If the loss determination finds that a loss is to be added, a losing outcome is selected and displayed without changing anything in the game event table. In other embodiments, the game counter is incremented and the inserted loss replaces whatever outcome was indicated in the game event list.

Bonus spins are another type of feature that can be implemented in a game event list. Bonus spins are discussed in detail in co-pending application Ser. No. 12/980,990, entitled MEANS FOR CONTROLLING PAYBACK PERCENTAGE OF GAMING DEVICE mentioned above. As discussed in that application, bonus spin systems can be used for both traditional game play, where outcomes are randomly selected for each gaming event that is initiated, or for event list based gaming outcomes where multiple game outcomes are selected prior to receiving game initiating inputs that ultimately correspond to the selected game outcomes. In either case, gaming machine operators want to configure overall payback % to match perceived marketing needs. With bonus spin systems instead of altering the weighted paytables and event list contents to account for the quantity and resolution of configuration options desired, bonus spins are implemented to personalize or customize gaming sessions.

In one example, a process begins with an event list being generated from a base game paytable. Returning to bonus spins, at the start of each game, rather than calling the event list processor directly, a bonus spin routine is first executed. This bonus spin routine may have a single binary output of TRUE or FALSE based on selecting a bonus spin value either randomly or from specified table and comparing that value to predefined criterion. For example, the predefined criterion may be a single input called True %, which determines how often the bonus spin routine returns a TRUE outcome as described above. Whenever the output of the bonus spin routine returns a value of FALSE, the outcome indicated in the game event list entry is executed using the base game paytable to determine a game outcome. However, when the output comes back TRUE, a winning outcome is selected from the win spin paytable and displayed. The Event List Processor remains undisturbed (i.e., its index does not increment). If the Weighted Paytable/Event List Processor pays 90% and the bonus spin paytable is set to 150%, the addition of the bonus spins may increase the overall payback percent to 95% or another value.

As mentioned in the event list application referenced above, one goal of an event list is to create more personalized experiences for players. In some embodiments, each player has their own event list so that the play of others does not trespass on their likelihood of winning. However, the bonus spin routines can be used to further personalize the uniformly created event list by adding winning free spins, bonuses, or other events. Additionally, the event lists can be manipulated in response to certain gaming conditions, such as the time of day or day of the week. For example, players of Platinum status may have more bonus spins than do players of Gold status. Further, players visiting during slow times may have fewer loss insertions and/or more free spin or bonus insertions than if the same player visited on New Year's Eve.

Below is an example of how bonus spins are placed in an event list. First, a list is populated with WIN and LOSS events exactly as discussed in the co-pending event list application referenced above:

TABLE 7

Example Game Event List

| ENTRY | GAME OUTCOME |
|---|---|
| 1 | LOSS |
| 2 | WIN |
| 3 | LOSS |
| 4 | LOSS |
| 5 | WIN |
| 6 | LOSS |
| 7 | LOSS |
| 8 | LOSS |
| 9 | WIN |
| 10 | WIN |

A bonus spin is inserted by locating (through random or nonrandom means) a LOSS location that is followed by a WIN. Within this list that occurs at positions 1, 4 and 8. Suppose position 8 is selected. Here's how the updated table looks:

TABLE 8

Example Game Event List with Bonus Spin Inserted

| ENTRY | GAME OUTCOME |
|---|---|
| 1 | LOSS |
| 2 | WIN |
| 3 | LOSS |
| 4 | LOSS |
| 5 | WIN |
| 6 | LOSS |
| 7 | LOSS |
| 8 | BONUS SPIN |
| 9 | WIN |
| 10 | WIN |

When the index is 8 and the BONUS SPIN event occurs, a loss is displayed exactly as if the event were a loss. Instead of ending the game at that point though, an audio-visual sequence is played to let the player know she's struck a bonus spin. This sequence can be simple or complex. This notification process may inform the player of the event while being dramatic and emotionally gratifying.

Once the sequence ends, the event list index is incremented (exactly as if another game were played but without deducting credits from the player's account) and the WIN at position 9 is executed. In some embodiments, bonus spins do not create specific win types or values. Rather, in these embodiments, they simply cause the game to move from a LOSS event to a WIN event (with audio-visual animation between) without charging the player for what is effectively a free game.

Figure 7:
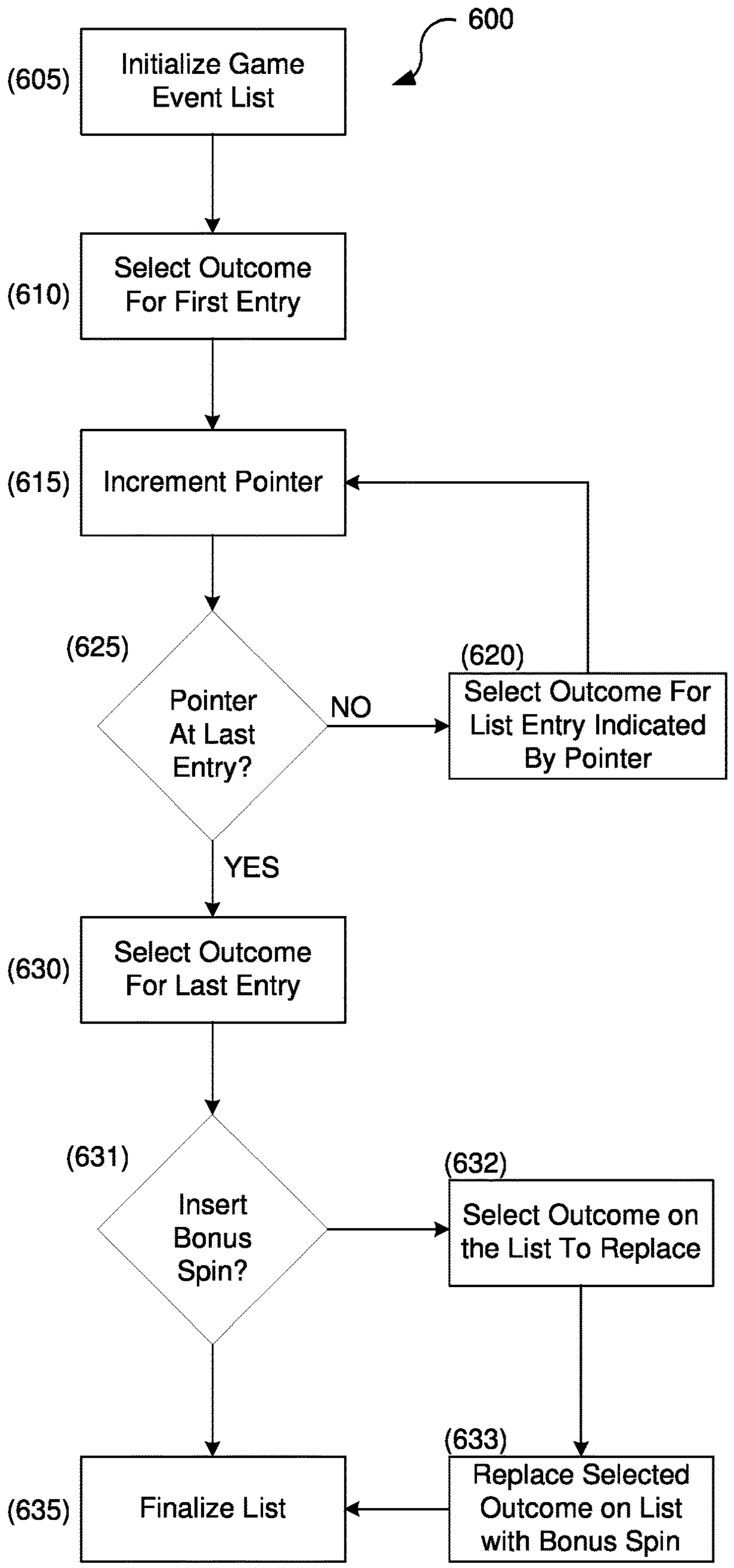
FIG. 7 is a flow diagram of method of implementing bonus spins into an event list for a gaming device according to embodiments of the invention.

FIG. 7 is a flow diagram of method of implementing bonus spins into an event list for a gaming device according to embodiments of the invention. Flow 600 includes similar processes to flow 400 shown in FIG. 5A. Similar processes will not, therefore, be described in detail here.

Referring to FIG. 7, flow 600 begins with process 605 where a game event is initialized. A first outcome is selected for an initial entry in a game event list in process 610 and a pointer is incremented in process 615. A determination about whether a pointer is pointing at a last list entry is made in process 625, and game outcomes are selected for each table entry in process 620 and the pointer incremented until all but a final entry in the game event list are filled. In process 630 a final game outcome is selected for the last entry in the game event list.

After all of the entries in a game event list are filled, process 631 determines is a bonus spin value is to be added to the game event list. If it is determined that a bonus spin is to be added to the game event list, flow 600 proceeds to process 632 where one of the game outcomes on the list is selected to be replaced by the bonus spin value. Here, particular conditions concerning implementation of a bonus spin are considered. For example, if a bonus spin can only replace a LOSS that precedes a WIN, only certain entries on the game event list may be selected to be replaced with a bonus spin. Once an outcome on the list is selected to be replaced in process 632, the selected game outcome is replaced with a BONUS SPIN entry. If no bonus spin is to be added to the list as determined in process 631, or a bonus spin has already been implemented into a game event list, flow 600 proceeds to process 635 where the game event list is finalized.

In an alternative implementation, the losing outcome is displayed along with an audio-video message or animation. Instead of an automatic respin, the player is given a free chance to spin again except that this free game's outcome is guaranteed to be a win. To make this clear, the "SPIN" button normally used to play the game may be reconfigured into a "WinSpin" button. In this alternative, the player is charged for the losing game—in other words the wager credit is deducted from the credit meter. But the next game—the bonus spin game—is played at the same bet size as the previous wager but the player is not charged for the game.

As discussed in the bonus spin application, each bet size may have its own bonus spin occurrence rate as specified by the casino at setup. Suppose this configuration value for each wager size is held in a variable called WSInc. In accordance with the example already described, the WSInc value for each wager size is as follows:

WSInc(25)=0
WSInc(50)=0.02
WSInc(100)=0.04
WSInc(200)=0.06
WSInc(500)=0.07
WSInc(1000)=0.08

At population time, the table length is multiplied by the appropriate WSInc value. If the table length is 10, and WSInc(200)=0.06, the result is a 0.6. That means 0.6 bonus spins are inserted into the event list for the 200 credit wager size. Of course, it is impossible to insert a fractional value. In this case, no bonus spins are inserted, but the fractional value is carried over to the next event list repopulation for that wager size, which in this case happens after the tenth game is played. An additional 0.6 bonus spins are added to the total, giving 1.2 bonus spins. In this case, one bonus spin is added to the event list and the 0.2 fraction is carried over to the next game.

Often it is important that a player's first experience with a new game be impressive so that the player associates that game with a positive experience. One way to make a first experience impressive is a winning streak. Since event lists, bonus spins and other such parameters are tracked by each individual player, we can insert additional bonus spins for the first sets of games a player plays. For example, if a player chooses to play a new game type, a number of bonus spins may be added so that the first X games pay 110%. Since bonus spins are effectively bonus payments, the base game paytables of the gaming devices do not have to be modified. After an introductory period, the bonus spin insertions may be removed or gradually decreased. Additionally, bonus spins could be added during a player's birthday or other events. In some embodiments, the rate of bonus spins may be increased when a player's loyalty to a game or casino appears to be fading.

In another implementation, a player's win frequency is increased by adding bonus spins for a period of time and/or skipping over LOSS outcomes in an event list without charging the player for the game. These techniques are useful for temporarily converting standard games into tournament games. In tournaments, a player is typically given a fixed number of games, or a fixed duration of play, during which the player accumulates as many credits as possible. These credits are not allowed to be cashed out and are good for no purpose other than establishing a score that is compared against other players. The highest scores usually wins cash prizes. One limitation for using traditional gaming devices as tournament games is the difficulty in changing out the pay tables of the game for the brief time a tournament lasts.

In one embodiment the bonus spin routine is created through software running on a computer such as a microprocessor. In another embodiment the bonus spin routine may be implemented in discrete logic, built using programmable logic or through other means. For purposes of this application, the bonus spin routine may include any mechanism in a game device or game system that allows for some control of typical game events. In some embodiments, the bonus spin routine may be directly implemented in the gaming device to control the payback percent on that gaming device. In other embodiments, the bonus spin routine may be implemented into a bonus controller (such as the bonus controller 40 shown in FIG. 1) or other peripheral device connected to the gaming device that allows control over aspects of game play. In yet other embodiments, the bonus spin routine may be implemented on a remote server that has at least some control over game play on a connected gaming device.

Tournament games may also be easily created without the use of bonus spins. Here, the conditions and parameters for a game event list just have to be modified prior to the generation of the game event list that is to be used in tournament play.

Many other features may also be implemented in game event lists. Two examples of features that can be implemented are nudges and near win outcomes. This (and other) features may be directly implemented into a game event list and specify certain actions be taken when they are executed in the game event list. For example, consider the following game event list in Table 9 whose implementation is discussed with reference to FIGS. 8A-8H

TABLE 9

Example Game Event List with Nudges and Near Wins

| ENTRY | GAME OUTCOME |
|---|---|
| 1 | LOSS |
| 2 | NUDGE |
| 3 | LOSS |
| 4 | WIN |
| 5 | NEAR WIN |
| 6 | LOSS |

FIGS. 8A, 8B, 8C, 8D, 8E, 8F, 8G, and 8H are detail diagrams of a gaming device as it progresses through a game session controlled by an event list according to embodiments of the invention.

Figure 8A:
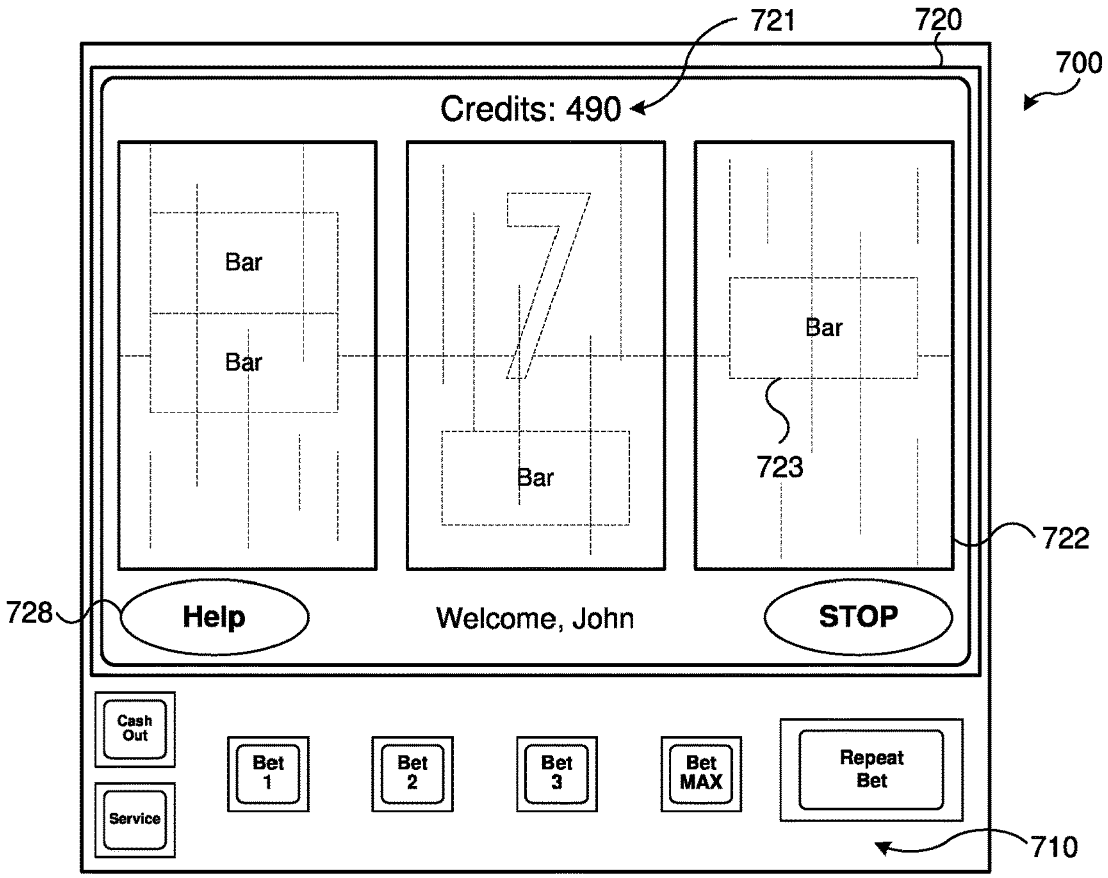
FIGS. 8A, 8B, 8C, 8D, 8E, 8F, 8G, and 8H are detail diagrams of a gaming device as it progresses through a game session controlled by an event list according to embodiments of the invention.
Figure 8B:
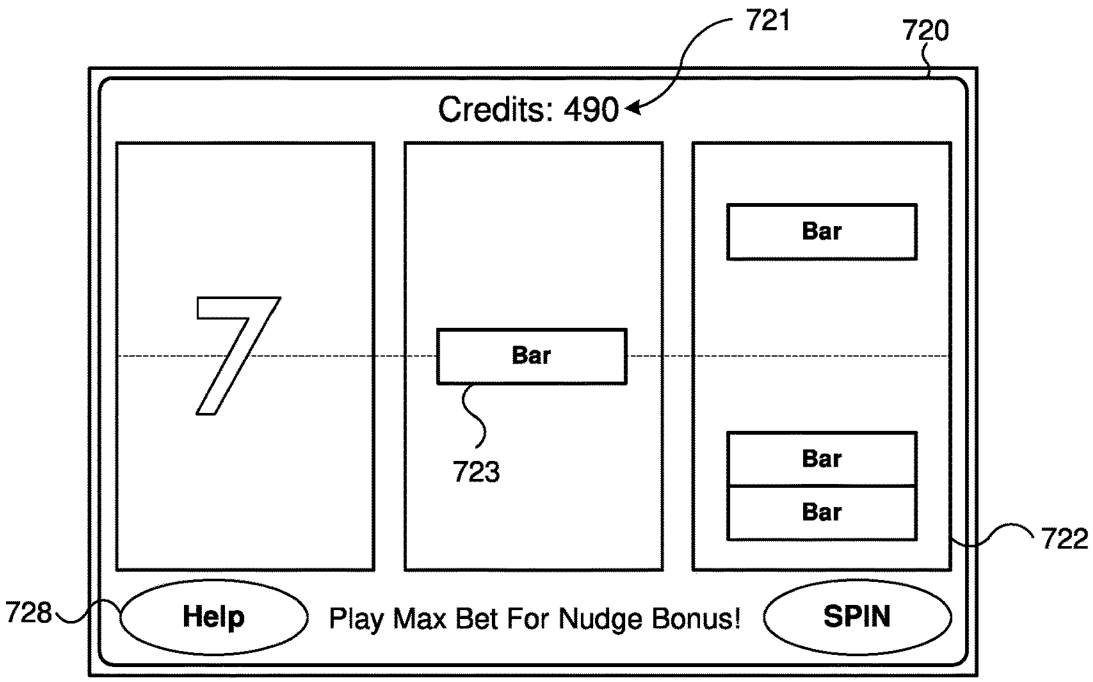
Figure 8C:
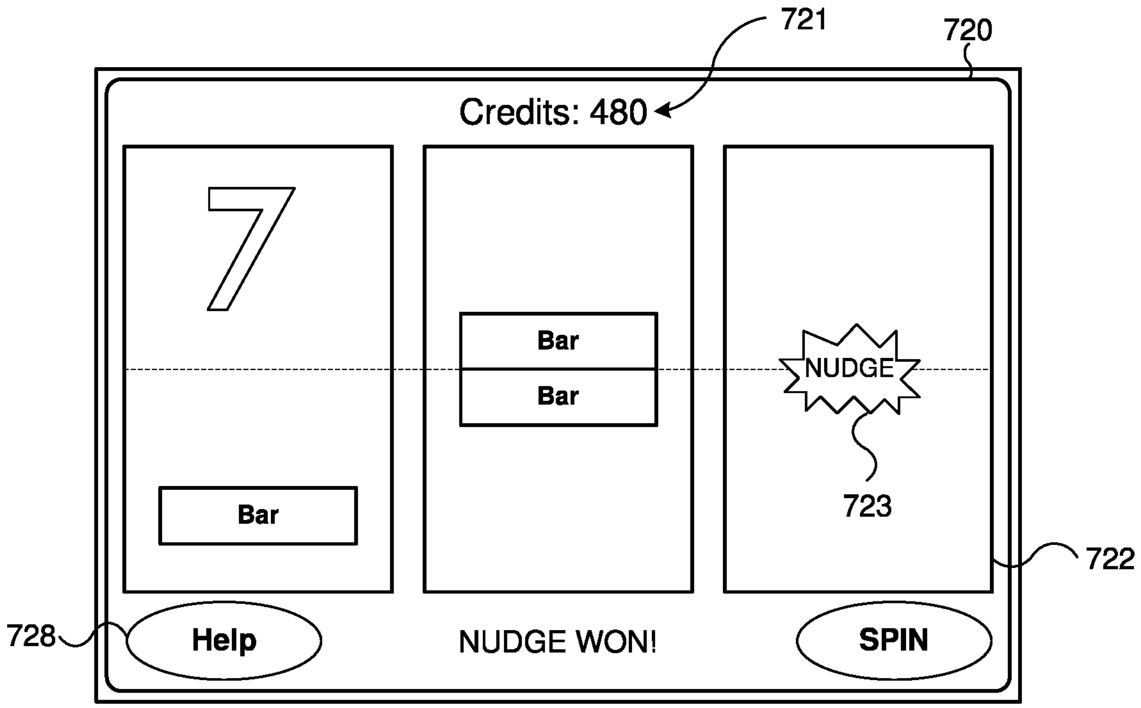

In FIG. 8A, a gaming device 700 includes a player interface panel 710 and a gaming display 720. The player interface panel 710 may include one or more game button and one or more game initiating input devices. The game display 720 includes a credit meter 721, three spinning video reels 722 each with a number of game symbols 723, and one or more game buttons 728. In FIG. 8A, a player has identified himself (John), inserted 500 credits on the game device, and placed a 10 credit wager. The credit meter 721 reflects that a 10 credit wager has been placed and the video reels 722 are currently spinning In FIG. 8B, a first game outcome is reached. Here, the game event list in Table 9 specifies that the game outcome is a LOSS. The game processor selects a losing outcome to display and the game reels 722 are stopped to show this selected losing outcome. In FIG. 8C, another 10 credits have been wagered and the game counter proceeds to the second entry in the game event list, which indicates a NUDGE is to be awarded. Here, as shown in FIG. 8C, a nudge symbol is direct to appear on the game display and be awarded to the player. The occurrence of a nudge symbol indicates that a player has now secured the ability to nudge the reels up or down to complete a winning symbol combination. In some embodiments, such as the one in this example, have a limited number of games that the awarded nudge can be used. In this case, the nudge must be used in 5 games.

Figure 8D:
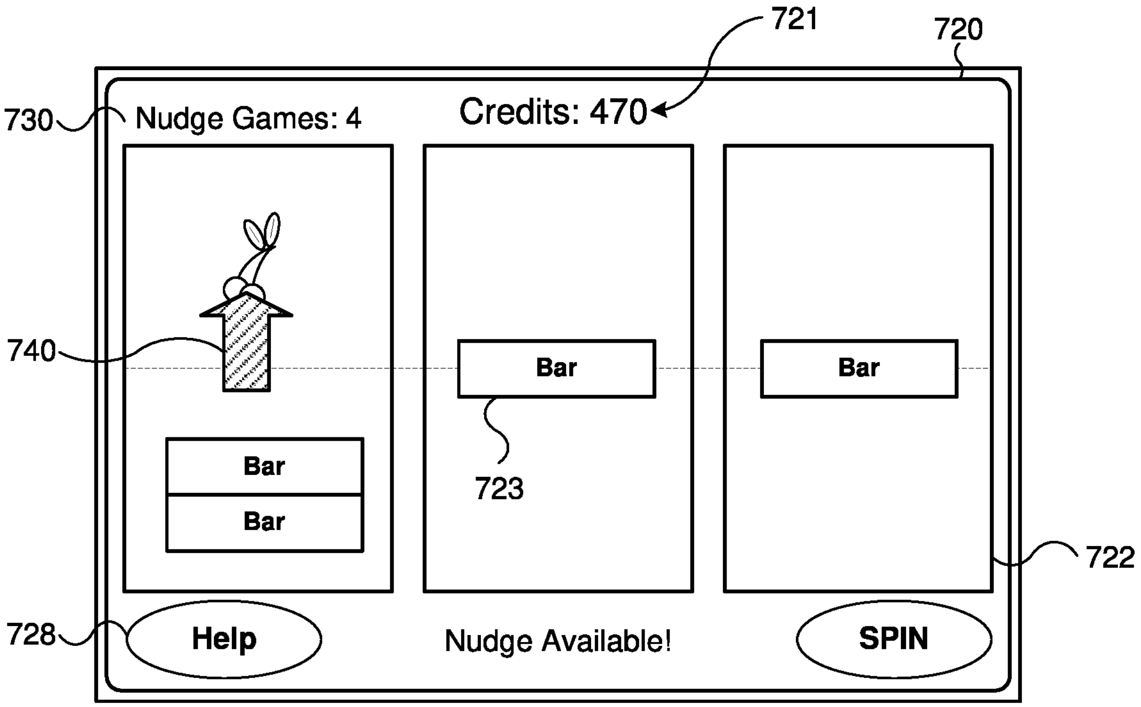

In FIG. 8D, a nudge meter 730 appears and another game is played. As specified in the game event list, the game outcome is again a loss. Here, however, a nudge is available to the player should they choose to use it. A nudge indicator 740 is displayed over a game reel 722 that can be nudged upward to complete a winning symbol combination. Here, the player may nudge the first reel up to complete an "Any Bar" symbol combination win. The nudge meter 730 indicates that the player still has four more games to use the nudge bonus. Here, since an "Any Bars" win does not have a large award and because more games exist to use the nudge, the player declines, and plays another game as shown in FIG. 8E.

Figure 8E:
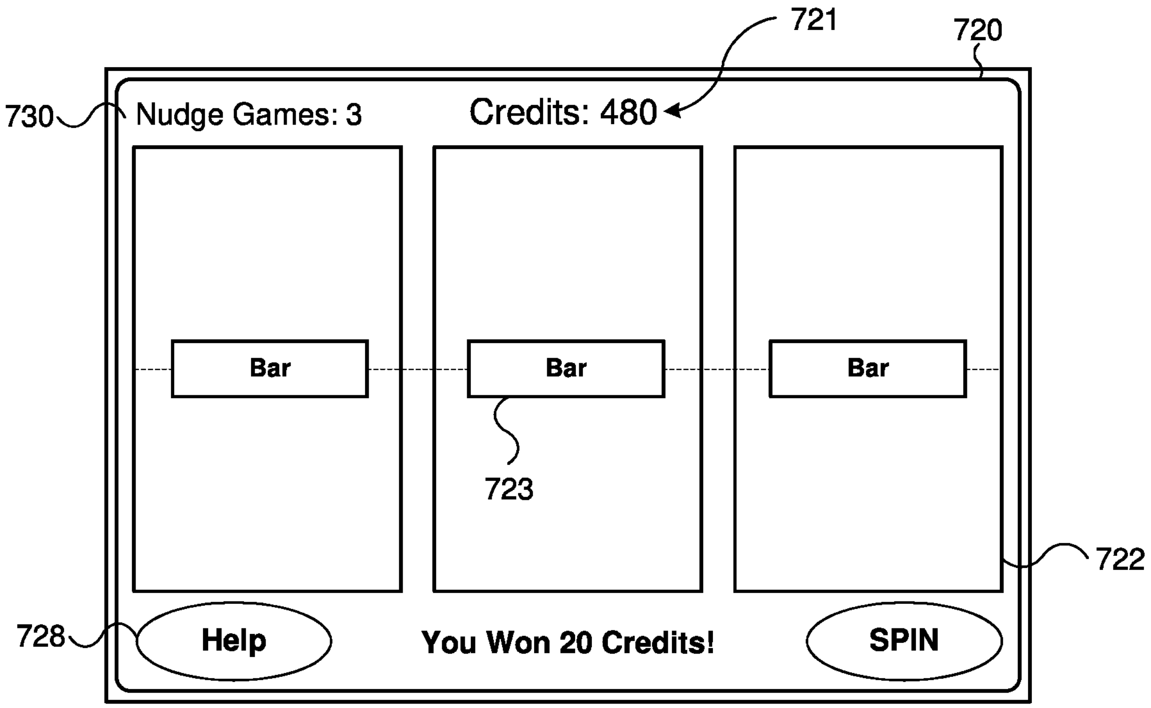
Figure 8F:
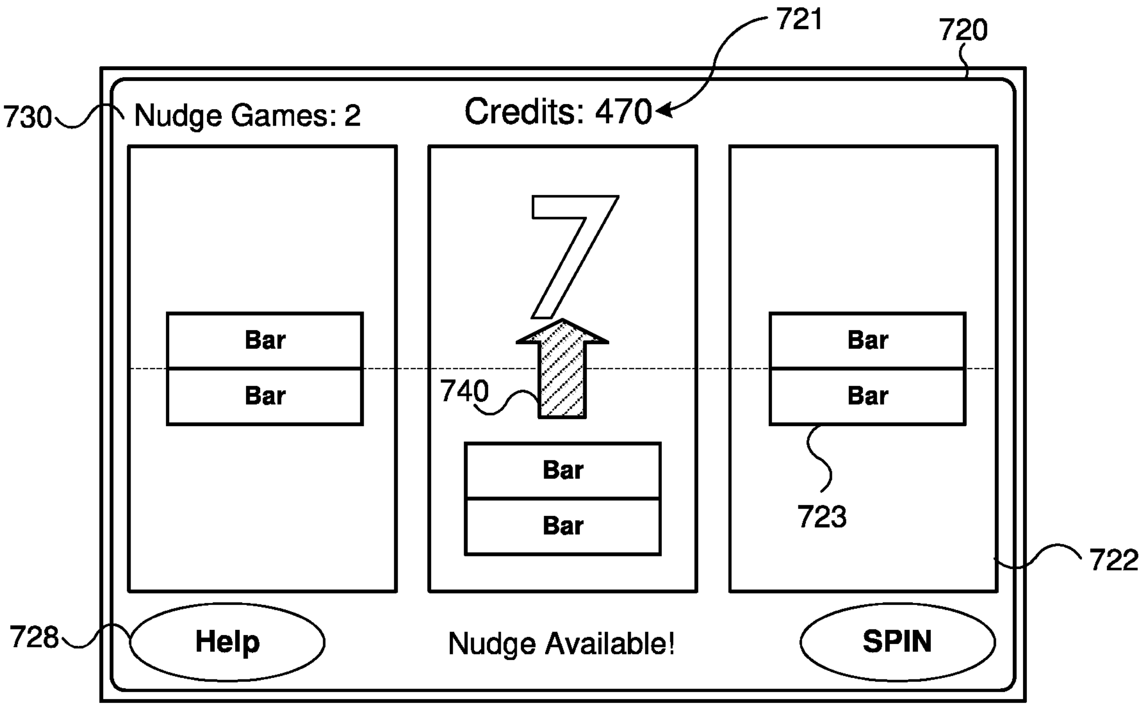

In FIG. 8E, the player has won a "Single Bar" combination. Here, the gaming event list indicated a WIN for a game outcome. The processor in the game device took this indication and used the weighted paytable to come up with the "Single Bar" win shown on the game display. Note that the nudge meter has also decremented and now only 3 games remain where the nudge can be used. In FIG. 8F, a NEAR WIN (sometimes called a near miss) is indicated in the game event list. Near wins may be implemented in a game event list to provide near win outcomes that entice a player to keep playing. They may also be implemented to ensure that a won NUDGE can be used. For example, a NEAR WIN may be automatically implemented within a NUDGE useful game range. In this example, a NEAR WIN would thus be implemented within the 5 games in the game event list after a NUDGE. In FIG. 8F, the NEAR WIN corresponds to a near win of "Double Bars." The nudge indicator 740 appears over the center game reel 722 to show the possible use of the stored nudge.

Figure 8G:
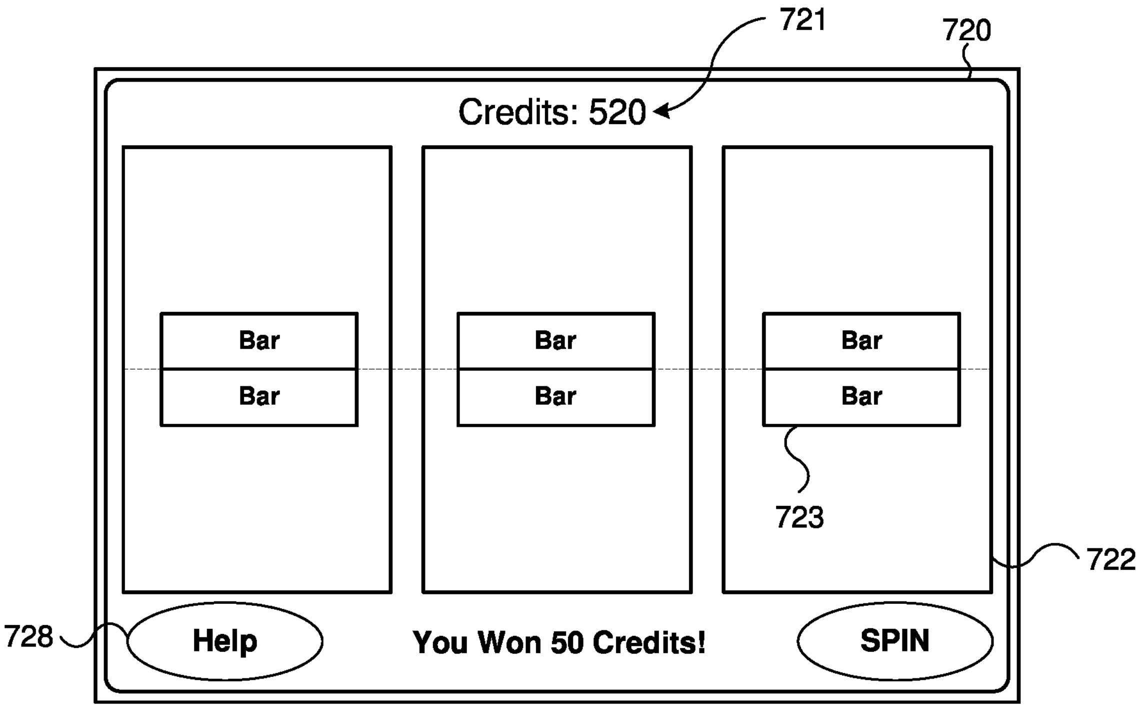
Figure 8H:
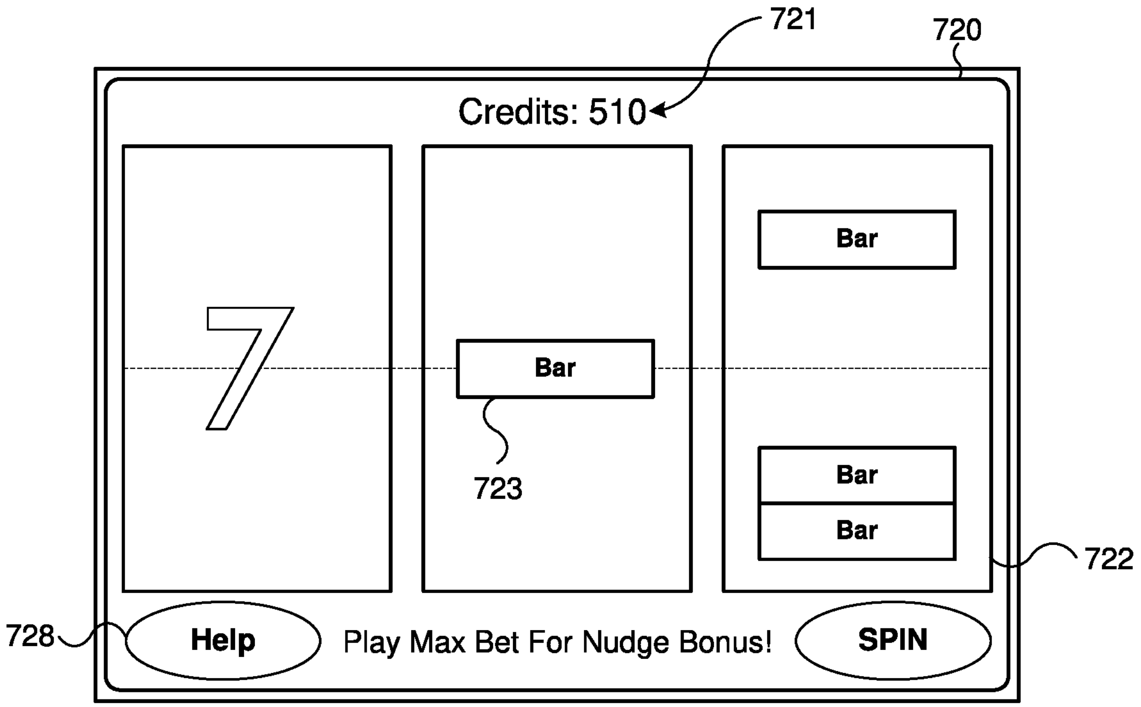

This time the player uses the nudge as shown in FIG. 8G. Here, the player moves the center reel 722 up by swiping his finger in an upward motion over the center reel 722 on the game display 720. The result of nudging the center reel up is a 50 credit win for the "Double Bar" symbol combination, which is reflected by the credit meter 721. In FIG. 8H, the player again receives a losing outcome as specified by the game event list shown in Table 9.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

What is claimed is:

1. A method comprising:

initializing, on an electronic casino gaming machine, a preconfigured electronic game event list comprising one or more game outcome entries;

receiving, via a button panel of the electronic casino gaming machine, a user input;

initiating, based on the user input, a first game on the electronic casino gaming machine;

based on initiating the first game, determining a first game outcome entry of the one or more game outcome entries in the preconfigured electronic game event list;

outputting, based on the first game outcome entry, a nudge symbol;

outputting, based on the nudge symbol, a nudge indicator over a game reel; and receiving, via a swiping motion on the game reel, a nudge command associated with the nudge indicator.

2. The method of claim 1, wherein the preconfigured electronic game event list comprises one or more entries and one or more outcomes associated with the one or more entries.

3. The method of claim 1, wherein the preconfigured electronic game event list is configured to comply with one or more game event list conditions and wherein the one or more game event list conditions comprise one or more of: one or more nudges, one or more near-win outcomes, one or more near-loss outcomes, a quantity of wins, a quantity of losses, a win percentage, a loss percentage, a paytable, or a paytable variance.

4. The method of claim 1, wherein initializing the preconfigured electronic game event list comprises one or more of: determining a length of one or more entries, determining a number of one or more entries, associating the preconfigured electronic game event list with an identified player, retrieving the preconfigured electronic game event list from memory, associating the preconfigured electronic game event list with the electronic casino gaming machine, or associating the preconfigured electronic game event list with a wager amount.

5. The method of claim 1, further comprising incrementing a list pointer.

6. The method of claim 1, further comprising determining, based on the nudge command, a second entry in the preconfigured electronic game event list.

7. The method of claim 1, further comprising:

determining a second game outcome of the preconfigured electronic game event list does not satisfy one or more game event list conditions; and based on the second game outcome not satisfying the one or more game event list conditions, incrementing a list pointer.

8. The method of claim 1, where receiving the user input comprises receiving a wager via one or more of: electronic funds transfer or receiving currency via a currency acceptor.

9. One or more non-transitory computer readable media storing processor executable instructions thereon, that when executed by at least one processor, cause the at least one processor to:

initialize, on an electronic casino gaming machine, a preconfigured electronic game event list comprising one or more game outcome entries;

receive, via a button panel of the electronic casino gaming machine, a user input;

initiate, based on the user input, a first game on the electronic casino gaming machine;

based on initiating the first game, determining a first game outcome entry of the one or more game outcome entries in the preconfigured electronic game event list;

output, based on the first game outcome entry, a nudge symbol;

output, based on the nudge symbol, a nudge indicator over a game reel; and receive, via a swiping motion on the game reel, a nudge command associated with the nudge indicator.

10. The one or more non-transitory computer readable media of claim 9, wherein the preconfigured electronic game event list comprises one or more entries and one or more outcomes associated with the one or more entries.

11. The one or more non-transitory computer readable media of claim 9, wherein the preconfigured electronic game event list is configured to comply with one or more game event list conditions and wherein the one or more game event list conditions comprise one or more of: one or more nudges, one or more near-win outcomes, one or more near-loss outcomes, a quantity of wins, a quantity of losses, a win percentage, a loss percentage, a paytable, or a paytable variance.

12. The one or more non-transitory computer readable media of claim 9, wherein the processor-executable instructions that, when executed by the at least one processor, cause the at least one processor to initialize the preconfigured electronic game event list, further cause the at least one processor to one or more of: determine a length of one or more entries, determine a number of one or more entries, associate the preconfigured electronic game event list with an identified player, retrieve the preconfigured electronic game event list from memory, associate the preconfigured electronic game event list with the electronic casino gaming machine, or associate the preconfigured electronic game event list with a wager amount.

13. The one or more non-transitory computer readable media of claim 9, wherein the processor-executable instructions, when executed by the at least one processor, further cause the at least one processor to increment a list pointer; and cause the at least one processor to adjust the list pointer to point to a next entry in the preconfigured electronic game event list.

14. The one or more non-transitory computer readable media of claim 9, wherein the processor-executable instructions, when executed by the at least one processor, further cause the at least one processor to determine, based on the nudge command, a second entry in the preconfigured electronic game event list.

15. The one or more non-transitory computer readable media of claim 9, wherein the processor-executable instructions, when executed by the at least one processor, further cause the at least one processor to:

determine a second game outcome in the preconfigured electronic game event list does not satisfy one or more game event list conditions; and based on the second game outcome not satisfying the one or more game event list conditions, increment a list pointer.

16. The one or more non-transitory computer readable media of claim 9, wherein the user input comprises one or more of: electronic funds transfer or receiving currency via a currency acceptor.

17. An electronic casino gaming machine apparatus comprising:

one or more processors; and memory storing processor executable instructions that, when executed by the one or more processors, cause the electronic casino gaming machine apparatus to:

initialize, on the electronic casino gaming machine apparatus, a preconfigured electronic game event list comprising one or more game outcome entries;

receive, via a button panel of the electronic casino gaming machine apparatus, a user input;

initiate, based on the user input, a first game on the electronic casino gaming machine apparatus;

based on initiating the first game, determining a first game outcome entry of the one or more game outcome entries in the preconfigured electronic game event list;

output, based on the first game outcome entry, a nudge symbol;

output, based on the nudge symbol, a nudge indicator over a game reel; and receive, via a swiping motion on the game reel, a nudge command associated with the nudge indicator.

18. The electronic casino gaming machine apparatus of claim 17, wherein the preconfigured electronic game event list comprises one or more entries and one or more outcomes associated with the one or more entries.

19. The electronic casino gaming machine apparatus of claim 17, wherein the preconfigured electronic game event list is configured to comply with one or more game event list conditions, wherein the one or more game event list conditions comprise one or more of: one or more nudges, one or more near-win outcomes, one or more near-loss outcomes, a quantity of wins, a quantity of losses, a win percentage, a loss percentage, a paytable, or a paytable variance.

20. The electronic casino gaming machine apparatus of claim 17, wherein the processor executable instructions, when executed by the one or more processors, further cause the one or more processors to increment a list pointer.

21. The electronic casino gaming machine apparatus of claim 17, wherein the processor executable instructions, when executed by the one or more processors, further cause the electronic casino gaming machine apparatus to: determine, based on the nudge command, a second entry in the preconfigured electronic game event list.

22. The electronic casino gaming machine apparatus of claim 17, wherein the processor executable instructions, when executed by the one or more processors, further cause the electronic casino gaming machine apparatus to:

determine a second game outcome of the preconfigured electronic game event list does not satisfy one or more game event list conditions; and based on the second game outcome not satisfying the one or more game event list conditions, increment a list pointer.

23. The electronic casino gaming machine apparatus of claim 17, wherein the user input comprises one or more of: electronic funds transfer or receiving currency via a currency acceptor.

* * * * *